DOCUMENTS

United States Patent
Bojinov et al.

(10) Patent No.: US 11,124,154 B1
(45) Date of Patent: Sep. 21, 2021

(54) TECHNIQUES FOR AUTHORIZING VEHICLES

(71) Applicant: Zoox, Inc., Foster City, CA (US)

(72) Inventors: Hristo Iankov Bojinov, Palo Alto, CA (US); Bryce Douglas Jones Carter, San Mateo, CA (US); Jimmy Ming Chiang, San Jose, CA (US); Ravi Gogna, San Jose, CA (US); Max Ellis Wolotsky, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 271 days.

(21) Appl. No.: 16/370,787

(22) Filed: Mar. 29, 2019

(51) Int. Cl.
| | |
|---|---|
| *B60R 25/00* | (2013.01) |
| *B60R 25/33* | (2013.01) |
| *G01C 21/32* | (2006.01) |
| *G05D 1/00* | (2006.01) |
| *G05D 5/00* | (2006.01) |
| *G07C 5/00* | (2006.01) |
| *G05D 1/02* | (2020.01) |

(52) U.S. Cl.
CPC ............ *B60R 25/33* (2013.01); *G01C 21/32* (2013.01); *G05D 1/0088* (2013.01); *G05D 1/0276* (2013.01); *G07C 5/008* (2013.01); *G05D 2201/0213* (2013.01)

(58) Field of Classification Search
CPC .... B60R 25/33; G05D 1/0088; G05D 1/0276; G05D 2201/0213; G05D 1/00; G05D 5/00; G07C 5/008; G01C 21/32; G06Q 50/00; G06Q 50/30; G01S 13/00; G01S 13/04; G01S 13/06; G01S 13/56; G01S 13/58
See application file for complete search history.

(56) References Cited

U.S. PATENT DOCUMENTS 10,055,831 B2 * 8/2018 Loveland ........... G06K 9/00637
2016/0091335 A1   3/2016 Bhatt et al.
(Continued)

FOREIGN PATENT DOCUMENTS

EP         3009324        4/2016

OTHER PUBLICATIONS

Office Action for U.S. Appl. No. 16/370,825, dated Apr. 14, 2021, Bojinov, "Techniques for Authorizing Vehicle Control Systems", 12 pages.

*Primary Examiner* — Yonel Beaulieu
(74) *Attorney, Agent, or Firm* — Lee & Hayes, P.C.

(57) ABSTRACT

Techniques and methods for security vehicle systems. For instance, a control system may receive a reported location of a vehicle. The control system may then receive sensor data generated by the vehicle. After receiving the sensor data, the control system may analyze the sensor data with respect to additional data associated with the reported location. The additional data may include map data representing the reported location and/or additional sensor data received from another vehicle or user device. The control system may determine whether the vehicle is at the reported location. If the control system determines that the vehicle is at the reported location, the control system may determine that the vehicle is not compromised. However, if the control system determines that the vehicle is not at the reported location, the control system may determine that the vehicle is compromised and may then perform one or more remedial actions.

20 Claims, 8 Drawing Sheets

(56) References Cited

U.S. PATENT DOCUMENTS

| | | | |
|---|---|---|---|
| 2016/0132705 A1* | 5/2016 | Kovarik | E01F 9/30 |
| | | | 340/10.3 |
| 2018/0130196 A1* | 5/2018 | Loveland | B64C 39/024 |
| 2018/0157255 A1* | 6/2018 | Halverson | B64C 39/024 |
| 2019/0265703 A1* | 8/2019 | Hicok | G06Q 50/30 |
| 2019/0339709 A1 | 11/2019 | Tay et al. | |
| 2020/0247430 A1 | 8/2020 | Rao et al. | |
| 2020/0294401 A1* | 9/2020 | Kerecsen | G05D 1/0287 |

* cited by examiner

TECHNIQUES FOR AUTHORIZING VEHICLES

BACKGROUND

An autonomous vehicle may navigate along designated routes or between waypoints according to a control system's response to receiving a request from a user device to pick up the user at a location and provide transport to a destination. However, in some circumstances, a nefarious actor may attempt to take control of an autonomous vehicle. For example, the nefarious actor may use a computing device to send instructions to the autonomous vehicle, which the autonomous vehicle may interpret as being sent from the control system, or otherwise spoof data on which the vehicle relies for determining a trajectory. As such, the autonomous vehicle may navigate along a route indicated by the nefarious actor. For another example, a nefarious actor may use a computing device to take control of the control system. The nefarious actor can then use the control system to control actions of an entire fleet of autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
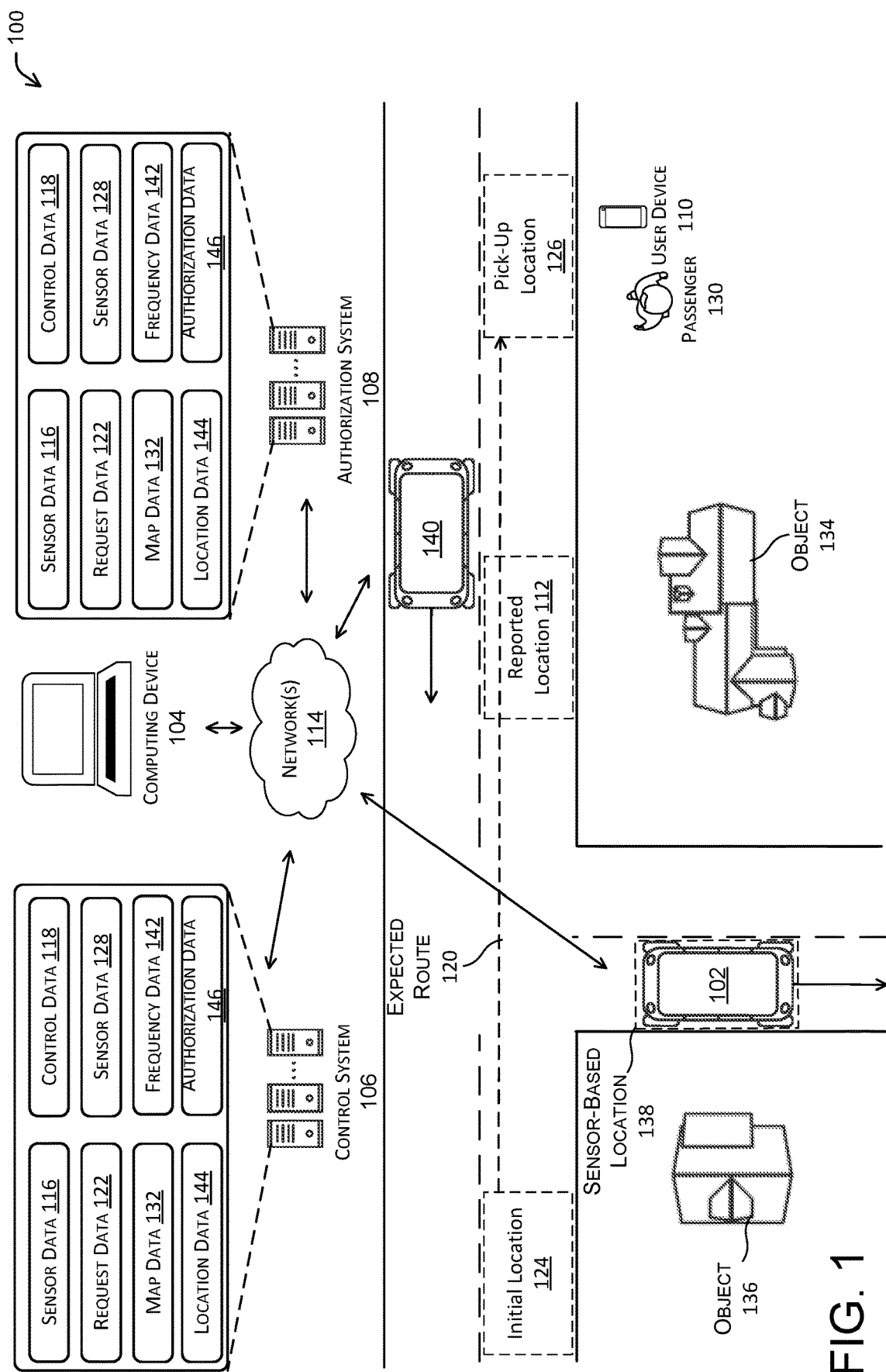
FIG. 1 is an example environment that includes systems implementing techniques for securing an autonomous vehicle, in accordance with embodiments of the disclosure.

As discussed above, a control system may send instructions to a fleet of vehicles, such as autonomous vehicles, that cause the vehicles to navigate along routes to destination locations. However, in some circumstances, a nefarious actor may attempt to take control of a vehicle. For a first example in which a vehicle is compromised, the nefarious actor may use a computing device to send instructions to the vehicle, which the vehicle may interpret as being sent from the control system. As such, the vehicle may navigate along a route indicated by the nefarious instructions. For a second example in which a control system or network component is compromised, a nefarious actor may use a computing device to take control of the control system. The nefarious actor can then use the control system to send (otherwise invalid) instructions to the fleet of vehicles.

As such, this application describes techniques for securing vehicle systems. For instance, and in circumstances where a nefarious actor may be sending instructions to a vehicle, such that the vehicle is compromised, the control system may determine a reported location of the vehicle. In some instances, the control system determines the reported location of the vehicle by receiving, from the vehicle, sensor data (e.g., global positioning system (GPS) data, lidar localization, visual localization, etc.) that indicates the reported location. In some instances, the control system determines the reported location of the vehicle based on a previous instruction sent from the control system to the vehicle. For instance, the previous instruction may indicate a route for the vehicle. Based on a time at which the control system sent the instruction, the control system may determine the reported location as being along the route.

In some instances, the control system determines the reported location of the vehicle by receiving, from carriers and/or wireless beacons, data indicating the reported location. For instance, the carriers and/or wireless beacons may determine the reported location using tower association and/or triangulation. Still, in some instances, the control system determines the reported location of the vehicle based on data received from a user device, where data represents a request for the vehicle. For instance, the control system may determine an initial location of the vehicle at a time at which the control system received the data from the user device. The control system may then determine a route from the initial location to a pickup location associated with the request. Based on a time at which the control system received the data, the control system may determine the reported location as being along the route.

The control system may then receive senor data from the vehicle. The sensor data may include, but is not limited to, image data generated by a camera of the vehicle, lidar data generated by a lidar sensor of the vehicle, location data (e.g., GPS data) generated by a location sensor (e.g., GPS sensor) of the vehicle, and/or the like. In some instances, the control system may receive the sensor data based on sending, to the vehicle, data representing a request for the sensor data. The request may indicate a type of sensor data and/or a sensor of the vehicle for generating the sensor data.

In some instances, the control system may analyze the sensor data with respect to the map data in order to determine a sensor-based location of the vehicle. The sensor-based location may include a position and/or orientation of the vehicle (e.g., one or more of an x-, y-, z-position, roll, pitch, or yaw). For example, the control system can use a map of an environment, as represented by the map data, to continuously determine a location and/or orientation of the vehicle within the map. In some instances, the control system can utilize SLAM (simultaneous localization and mapping), CLAMS (calibration, localization and mapping, simultaneously), relative SLAM, iterative closest point, bundle adjustment, non-linear least squares optimization, or the like to receive image data, lidar data, radar data, IMU data, GPS data, wheel encoder data, and the like to accurately determine the sensor-based location of the vehicle.

U.S. patent application Ser. No. 15/675,487 filed Aug. 11, 2017, entitled "Sensor Perturbation" is also incorporated by reference in its entirety.

The control system may then determine a difference between the sensor-based location and the reported location. In some instances, the difference may be in the x-position, the y-position, and/or the z-position. Additionally, or alternatively, in some instances, the difference may be in the roll, the pitch, and/or the yaw. The control system may determine if the difference is equal to or greater than a threshold distance. In some instances, the threshold may include, but is not limited to, five feet, one hundred feet, five hundred feet, and/or any other distance. Based on determining that the difference is less than the threshold distance, the control system may determine that the vehicle is at the reported location. However, based on determining that the difference is equal to or greater than the threshold distance, the control system may determine that the vehicle is not at the reported location and as such, the vehicle is unauthorized.

Additionally, or alternatively, in some instances, the control system may then compare the sensor data to a portion of map data representing a map, where the portion of the map data represents the reported location of the vehicle. For instance, the control system may compare at least one feature represented by the sensor data to at least one feature represented by the portion of the map data. If the control system determines that the at least one feature represented by the sensor data matches the at least one feature represented by the portion of the map data, the control system may determine that the vehicle is at the reported location and as such, the vehicle is not authorized (e.g., not compromised). As a non-limiting example, such a comparison may comprise an error in localization using any one or more of visual sensor data (e.g., from one or more cameras), lidar sensor data (from one or more lidars), etc. with respect to a map of such data. However, if the control system determines that the at least one feature represented by the sensor data does not match the at least one feature represented by the portion of the map data, the control system may determine that the vehicle is not at the reported location and as such, that the vehicle is unauthorized (e.g., compromised).

Additionally, or alternatively, in some instances, the control system may compare the sensor data to additional sensor data received from another vehicle. For a first example, the control system may receive, from the other vehicle, additional sensor data (e.g., location data) indicating that the other vehicle is located at the reported location. The control system may then determine whether the sensor data generated by the vehicle represents the other vehicle. If the control system determines that the sensor data represents the other vehicle, the control system may determine that the vehicle is located at the reported location and as such, authorized. However, if the control system determines that the sensor data does not represent the other vehicle, the control system may determine that the vehicle is not located at the reported location and as such, unauthorized.

For a second example, again when the other vehicle is located at the reported location, the control system may receive additional second data from the other vehicle, such as image generated by a camera, lidar data generated by a lidar sensor, and/or the like. The control system may then determine whether the additional sensor data generated by the other vehicle represents the vehicle. If the control system determines that the additional sensor data represents the vehicle, the control system may determine that the vehicle is located at the reported location and as such, authorized. However, if the control system determines that the additional sensor data does not represent the vehicle, the control system may determine that the vehicle is not located at the reported location and as such, unauthorized.

Additionally, or alternatively, in some instances, such as when the sensor data includes the location data generated by the location sensor of the vehicle, the control system may determine whether the sensor-based location of the vehicle, as indicated by the location data, matches the reported location of the vehicle. In some examples, the control system may determine that the sensor-based location matches the reported location when the sensor-based location is within a threshold distance to the reported location. As described herein, a threshold distance may include, but is not limited to, five feet, one hundred feet, five hundred feet, and/or any other distance. If the control system determines that the sensor-based pose matches the reported pose, the control system may determine that the vehicle is located at the reported location and as such, authorized. However, if the control system determines that the sensor-based pose does not match the reported pose, the control system may determine that the vehicle is not located at the reported location and as such, unauthorized.

In some instances, when the control system determines that the vehicle is not located at the reported location, the control system may perform one or more actions. For a first example, the control system may send, to the vehicle, an instruction that causes the vehicle to perform a maneuver, such as stopping. For a second example, the control system may perform similar techniques, as described above with respect to the vehicle, to determine if one or more other vehicles are also unauthorized. Still, for a third example, the control system may send one or more instructions to one or more other vehicles, where the one or more instructions cause the one or more other vehicles to perform maneuver(s), such as stopping or navigate to the reported location of the vehicle. While these are just a couple of examples of actions that may be performed by the control system, in other examples, the control system may perform other actions in response to determining that the vehicle is not located at the reported location.

In circumstances where the nefarious actor may be controlling the control system to send instructions to the vehicles, such that the control system is compromised, an authorization system may use different techniques to determine that the control system is compromised based on the type of data (e.g., type of location data) being sent by the control system. For instance, the authorization system may use frequency data representing frequencies at which destination locations are associated with pick-up locations for the fleet of vehicles. A destination location may be associated with a pick-up location when a route taken by a vehicle includes picking up a passenger at the pick-up location and dropping off the passenger at the destination location. In some instances, the authorization system generates the frequency data using data representing routes taken by the fleet of vehicles, where the routes include the pick-locations and the destination locations. For a first, the authorization system may analyze the data using machine learned models to determine the frequencies. For a second example, the authorization system may determine the frequencies using a graphical representation (e.g., histogram, etc.) of the data representing the routes.

In some instances, the authorization system may generate the frequency data using data representing routes taken by a specific passenger. For instance, the routes may include pick-up locations and destination locations that the passenger has previously taken. The authorization system may use the data to determine frequencies at which the passenger sends requests that include destination locations associated with pick-up locations.

In some instances, the authorization system may use other contextual data when generating the frequency data. For a first example, the authorization system may use the time of day, time of year, and/or another time period when generating the frequency data. For instance, the authorization system may generate the frequency data using data that represents routes which fall within the time period. For a second example, the authorization system may use other factors, such as the weather or crime rates in areas when generating the frequency data.

To determine if the control system is compromised, the authorization system may receive a request for the vehicle to pick up a passenger at a first location and drop off the passenger at a second location. The authorization system may then determine that the first location includes a pick-up location from the frequency data and the second location includes a destination location from the frequency data. Based on the match, the authorization system may identify the frequency that corresponds to the pick-up location and destination location pair. The authorization system may then determine whether the frequency is less than or equal to a threshold frequency. The threshold frequency may include, but is not limited to, one ride per week, one ride per month, one ride per year, and/or any other frequency. If the authorization system determines that the frequency is less than or equal to the threshold frequency, then the authorization system may determine that the request is suspicious and/or the control system is compromised. However, if the authorization system determines that the frequency is greater than the threshold frequency, then the authorization system may determine that the request is not suspicious and/or the control system is not compromised. Of course, though described with respect to a single pick-up and drop-off location, such determinations may be made within a range of geographic locations (e.g., all pick-up locations within a block and corresponding respective drop-off locations) at a coarser discretization level.

In some instances, when making the determination, the authorization system may use the data representing the routes taken by the passenger associated with the request. For example, even if the frequency is less than or equal to the threshold frequency, the authorization system may determine an additional frequency that the actual passenger sends requests that include the pick-up location and the destination location. In such an example, if the authorization system determines that the additional frequency is less than or equal to the threshold frequency (and/or another threshold frequency), then the authorization system may determine that the request is still suspicious and/or the control system is still compromised. However, if the authorization system determines that the additional frequency is greater than the threshold frequency (and/or the other threshold frequency), then the authorization system may determine that the request is actually not suspicious and/or the control system is actually not compromised.

The authorization system may perform similar processes for one or more other vehicles. In some instances, the authorization system may determine that the control system is compromised when a threshold number of requests are determined to be suspicious. The threshold number of requests may include, but is not limited to, one request, five requests, ten requests, one hundred requests, and/or any other number. Additionally, or alternatively, in some instances, the authorization system may determine that the control system is compromised when a threshold frequency of requests are determined to be suspicious. The threshold frequency of requests may include, but is not limited to, one request per day, five requests per day, ten requests per day, one hundred requests per week, and/or any other frequency.

The authorization system may then perform one or more actions based on determining that a request is suspicious or the control system is compromised. For a first example, the authorization system may send, to a computing device associated with a teleoperator, an additional request to authorize the suspicious request. After sending the additional request, the authorization system may receive, from the computing device associated with the teleoperator, data representing a control to send the vehicle to the pick-up location (e.g., if the request is not suspicious) or a control to refrain from sending the vehicle to the pick-up location (e.g., if the request is suspicious). For a second example, the authorization system may send, to the computing device associated with the teleoperator, data indicating that the control system is compromised. For a third example, the authorization system may send, to the vehicle, data representing an instruction to navigate to a new pick-up location associated with a new request.

Additionally, or alternatively, in some instances, the authorization system may determine whether the control system is compromised based on data that the control system is sending the to the authorization system. For a first example, the control system may be sending location data to the authorization system, where the location data indicates an inaccurate location of the vehicle. For a second example, the control system may be sending location to the authorization system, where the location data indicates the accurate location of the vehicle. However, even though the location data indicates the accurate location of the vehicle, the control system may be causing the vehicle to navigate to unauthorized locations.

In the first example, and in circumstances where the control system may be sending location data that indicates an inaccurate location of the vehicle, the authorization system may receive the location data from the control system. The authorization system may then determine the reported location for the vehicle as the inaccurate location indicated by the location data. Additionally, the authorization system may receive data representing an sensor-based location of the vehicle. In some instances, the authorization system receives the data from the vehicle. For instance, the data may include sensor data (e.g., location data) generated by a sensor (e.g., location sensor) of the vehicle, where the sensor data represents the sensor-based location of the vehicle. In some instances, the authorization system receives the data from a user device. For instance, the user device may be located within the vehicle, and the data may include sensor data indicating a current location of the user device. As such, the current location of the user device may include the sensor-based location of the vehicle. Any such localization information may be generated in accordance with any of the techniques described herein.

The authorization system may then compare the reported location of the vehicle to the sensor-based location of the vehicle. Based on the comparing, the authorization system may determine whether the vehicle is located at the reported location. In some instances, the authorization system may determine that the vehicle is located at the reported location (e.g., the sensor-based location matches the reported location) when the sensor-based location is within a threshold distance to the reported location, but determine that the vehicle is not located at the reported location (e.g., the sensor-based location does not match the reported location) when the sensor-based location is outside of the threshold distance to the reported location. If the authorization system determines that the vehicle is located at the reported location, the authorization system may determine that the control system is authorized (e.g., not compromised). However, if the authorization system determines that the vehicle is not located at the reported location, the authorization system may determine that the control system is unauthorized (e.g., compromised).

For a second example, and in circumstances where the control system may be sending location data that indicates an accurate, but unauthorized location of the vehicle, the authorization system may again receive the location data from the control system (and/or the vehicle). In these circumstances, the location indicated by the location data may include the sensor-based location of the vehicle. As such, the authorization system may determine an reported location (or locations along a route) for the vehicle. In some instances, the authorization system determines the reported location (or locations) using data received from the user device. For instance, the data may represent a request for the vehicle, where the request indicates a pickup location. The authorization system may then determine route(s) for the vehicle using an initial location of the vehicle, which is where the vehicle was located at a time of receiving the request, and the pickup location. Using the route(s), the authorization system may determine that the reported location includes at least one location along the route(s).

The authorization system may then compare the reported location of the vehicle to the sensor-based location of the vehicle. For instance, the authorization system may determine whether the sensor-based location of the vehicle is along the expected route. If the authorization system determines that the sensor-based location is along the expected route, then the authorization system may determine that the control system is authorized. However, if the authorization system determines that the sensor-based location is not along the expected route, then the authorization system may determine that the control system is not authorized.

In some instances, the authorization system may perform one or more actions based on determining that the control system is unauthorized. For a first example, the authorization system may send, to the vehicle, instructions(s) that cause the vehicle to perform one or more maneuvers, such as stopping. For a second example, the authorization system may begin to perform similar techniques for other vehicles to confirm whether the control system is unauthorized. For a third example, the authorization system may send, to another vehicle, an instruction that causes the other vehicle to navigate to the reported location and/or the sensor-based location of the vehicle. Once at the reported location and/or the sensor-based location, the authorization system may analyze sensor data generated by the other vehicle to determine if the sensor data represents the vehicle. If the sensor data represents the vehicle, then the authorization system may determine that the control system is actually authorized. While these are just a couple of examples of actions that may be performed by the authorization system, in other examples, the authorization system may perform other actions in response to determining that the control system is unauthorized.

Although the above examples describe the control system as determining whether the vehicle is compromised, in other examples, any other computing device may determine whether the vehicle is authorized. For example, the authorization system, the user device, and/or another vehicle may use similar techniques to determine whether the vehicle is authorized. Furthermore, although the above examples describe the authorization system as determining whether the control system is authorized, in other examples, any other computing device may determine whether the control system is authorized. For example, the vehicle, the user device, and/or another vehicle may use similar techniques to determine whether the control system is authorized.

Additionally, although the above examples describe the control system as sending instructions to the fleet of vehicles, in other examples, multiple control systems may be used to send the instructions to the fleet of vehicles. In such examples, a control system from the multiple control systems may send instructions to one or more vehicles included in the fleet of vehicles. Furthermore, in some examples, a control system may include, but is not limited to, an electronic device, multiple electronic devices, a service, one or more services, a remote system, one or more remote systems, a component of a vehicle, and/or the like.

The techniques described herein can be implemented in a number of ways. Example implementations are provided below with reference to the following figures. Although discussed in the context of a vehicle, the methods, apparatuses, and systems described herein can be applied to a variety of systems.

FIG. 1 is an example environment 100 that includes systems implementing techniques for securing a vehicle 102, in accordance with embodiments of the disclosure. For example, a nefarious actor may be using a computing device 104 to send data representing instructions to the vehicle 102, such that the vehicle 102 is compromised. To determine that the vehicle 102 is compromised, a control system 106 (and/or an authorization system 108) (and/or a user device 110) may determine an reported location 112 of the vehicle 102. In some instances, the control system 106 may determine the reported location 112 of the vehicle 102 by receiving, from the vehicle 102 and over network(s) 114, sensor data 116 from the vehicle 102 that indicates the reported location 112. For example, the sensor data 116 may include location data (e.g., GPS data) generated by a location sensor (e.g., GPS sensor) of the vehicle 102.

In some instances, the control system 106 may determine the reported location 112 of the vehicle 102 based on control data 118 sent by the control system 106 to the vehicle 102. For instance, the control data 118 may represent a previous instruction for the vehicle 102, where the previous instruction indicates an expected route 120 for the vehicle 102 that includes the reported location 112. In some instances, the control system 106 may determine the reported location 112 of the vehicle 102 by receiving, from the user device 110, request data 122 representing a request for the vehicle 102. For instance, the control system 106 may determine the expected route 120 based on an initial location 124 of the vehicle 102, which is where the vehicle 102 was located at the time of receiving the request, to a pick-up location 126 indicated by the request data 122. The control system 106 may then determine the reported location 112 as at least one location along the expected route 120.

Still, in some instances, but not illustrated in the example of FIG. 1, the control system 106 may determine the reported location 112 of the vehicle 102 using sensor data 128 generated by the user device 110. For example, a passenger 130 in possession of the user device 110 may be located within the vehicle 102. Additionally, the sensor data 116 may include location data (e.g., GPS data, lidar data, camera data, IMU data, etc.) generated by a location sensor (e.g., a GPS sensor) of the user device 110, where the location data indicates the current location of the user device 110. In such an example, and since the user device 110 is located within the vehicle 102, the control system 106 may determine that the current location of the user device 110 includes the reported location 112 for the vehicle 102.

The control system 106 may then receive senor data 116 from the vehicle 102 and/or sensor data 128 from the user device 110. In some instances, to receive the sensor data 116, the control system 106 may send, to the vehicle, request data 122 representing a request for the sensor data 116. The request may include, but is not limited to, a type of sensor data (e.g., image data, lidar data, etc.) and/or a sensor of the vehicle 102 for generating the sensor data 116. The vehicle 102 may receive the request data 122 from the control system 106 and, in response, generate the sensor data 116 according to the request. For example, if the request indicates a sensor for generating the sensor data 116, the vehicle 102 may generate the sensor data 116 using the sensor. The vehicle 102 may then send the sensor data 116 to the control system 106.

In some instances, the control system 106 may then compare the sensor data 116 to a portion of map data 132 representing a map (described in detail below) of at least the environment 100, where the portion of the map data 132 represents the reported location 112 of the vehicle 102. For instance, and in the example of FIG. 1, the portion of the map data 132 may represent at least feature(s) of a first object 134 (e.g., a first house) located near the reported location 112 (e.g., using a mesh, volumetric representation, image based feature maps, etc.). Additionally, the sensor data 116 may represent feature(s) of a second object 136 (e.g., a second house) located near an sensor-based location 138 of the vehicle 102.

As such, and in some examples, the control system 106 may determine a sensor-based location of the vehicle 102. The sensor-based location may include a position and/or orientation (together a pose) of the vehicle 102 (e.g., one or more of an x-, y-, z-position, roll, pitch, or yaw). For example, the control system 106 can use a map of an environment, as represented by the map data 132, to continuously determine a location and/or orientation of the vehicle 102 within the map. In some instances, the control system 106 can utilize SLAM (simultaneous localization and mapping), CLAMS (calibration, localization and mapping, simultaneously), relative SLAM, bundle adjustment, non-linear least squares optimization, iterative closest point, or the like to receive image data, lidar data, radar data, IMU data, GPS data, wheel encoder data, and the like to accurately determine the sensor-based location of the vehicle 102.

The control system 106 may determine, based on the analysis, the sensor-based location 138 of the vehicle. The control system 106 may then determine a difference between the sensor-based location 138 and the reported location 112. Additionally, the control system 106 may determine if the difference is equal to or greater than a threshold difference (distance in space and/or difference in angles). As discussed herein, the threshold may include, but is not limited to, five feet, one hundred feet, five hundred feet, and/or any other distance. Based on determining that the difference is less than the threshold distance, the control system 106 may determine that the vehicle 102 is at the reported location 112. However, and in the example of FIG. 1, based on determining that the difference is equal to or greater than the threshold distance, the control system 106 may determine that the vehicle 102 is not located at the reported location 112 and as such, the vehicle 102 is unauthorized.

Additionally, or alternatively, in some instances, the control system 106 may compare the sensor data 116 received from the vehicle 102 to sensor data 116 received from an additional vehicle 140. For a first example, the control system 106 may receive, from the additional vehicle 140, sensor data 116 indicating that the additional vehicle 140 is located within a threshold distance from the reported location 112. The control system 106 may then determine whether the sensor data 116 generated by the vehicle 102 represents the additional vehicle 140. For instance, the control system 106 may determine whether image data, generated by a camera of the vehicle 102, represents the additional vehicle 140. If the control system 106 determines that the sensor data 116 represents the additional vehicle 140, the control system 106 may determine that the vehicle 102 is located at the reported location 112. However, and in the example of FIG. 1, if the control system 106 determines that the sensor data 116 does not represent the additional vehicle 140, the control system 106 may determine that the vehicle 102 is not located at the reported location 112.

For a second example, the control system 106 may receive additional sensor data 116 from the additional vehicle 140. The control system 106 may then determine if the additional sensor data 116 represents the vehicle 102. For instance, if the additional sensor data 116 includes image data generated by a camera of the additional vehicle 140, the control system 106 may determine if the image data represents the vehicle 102. If the control system 106 determines that the additional sensor data 116 represents the vehicle 102, the control system 106 may determine that the vehicle 102 is located at the reported location 112. However, and in the example of FIG. 1, if the control system 106 determines that the additional sensor data 116 does not represent the vehicle 102, the control system 106 may determine that the vehicle 102 is not located at the reported location 112.

In some instances, when there is a discrepancy between the sensor data 116 from the vehicle 102 and the sensor data 116 from the additional vehicle 140, such that the sensor data 116 of one vehicle does not match the sensor data 116 of the other vehicle (from the examples above), the control system 106 may send, to a third vehicle, data representing an instruction to navigate to the reported location 112. The control system 106 may then receive, from the third vehicle, data indicating whether the third vehicle detected the vehicle 102 and/or the additional vehicle 140 at the reported location 112. In other words, the third vehicle may determine whether the vehicle 102 and/or the additional vehicle 140 is compromised.

In some instances, the control system 106 may continuously perform the techniques described herein to determine whether the vehicle 102 is at an reported location. In some instances, the control system 106 may perform the techniques described herein at given time intervals. For instance, the control system 106 may determine whether the vehicle 102 is at an reported location every minute, ten minutes, hour, and/or the like. Still, in some instances, the control system 106 may perform similar techniques to determine if other vehicles are at reported locations, such as the additional vehicle 140.

In some instances, based on determining that the vehicle 102 is not located at the reported location 112 and/or unauthorized, the control system 106 may take one or more actions. For a first example, the control system 106 may send, to the vehicle 102, control data 118 representing an instruction to perform a maneuver, such as stopping. For a second example, the control system 106 may perform similar techniques, as described above with respect to the vehicle 102, to determine if one or more other vehicles are located at reported location. For instance, the control system 106 may perform the techniques described above to determine if the additional vehicle 140 is located at an reported location. Still, for a third example, the control system 106 may send, to the additional vehicle 140, control data 118 that represents an instruction to navigate to the reported location 112 and/or the sensor-based location 138 of the vehicle 102. In other words, the control system 106 may use the additional vehicle 140 to confirm the sensor-based location 138 of the vehicle 102.

Additionally, or alternatively, in some instance, the nefarious actor may be using the computing device 104 to cause the control system 106 to send control data 118 to the vehicle 102 (and/or other vehicles). As such, the authorization system 108 may determine if the control system 106 is compromised. For instance, the authorization system 108 may use frequency data 142 representing frequencies at which destination locations are associated with pick-up locations for the fleet of vehicles. A destination location may be associated with a pick-up location when a route taken by a vehicle includes picking up a passenger at the pick-up location and dropping off the passenger at the destination location. In some instances, the authorization system 108 (and/or the control system 106) generates the frequency data 142 using data representing routes taken by the fleet of vehicles, where the routes include the pick-locations and the destination locations. Additionally, or alternatively, in some instances, the authorization system 108 may generate the frequency data 142 using data representing routes taken by a specific passenger. For instance, the routes may include pick-up locations and destination locations that the passenger has previously taken. The authorization system 108 may use the data to determine frequencies at which the passenger sends requests that include destination locations associated with pick-up locations.

To determine if the control system 106 is compromised, the authorization system 108 may receive request data 122 representing a request for the vehicle 102 to pick up a passenger 130 at a first location (e.g., the pick-up location 126) and drop off the passenger at a second location. The authorization system 108 may then determine that the first location includes a pick-up location from the frequency data 142 and the second location includes a destination location from the frequency data 142. Based on the match, the authorization system 108 may identify the frequency that corresponds to the pick-up location and destination location pair. The authorization system 108 may then determine whether the frequency is less than or equal to a threshold frequency. The threshold frequency may include, but is not limited to, one ride per week, one ride per month, one ride per year, and/or any other frequency. If the authorization system 108 determines that the frequency is less than or equal to the threshold frequency, and as illustrated in FIG. 1, then the authorization system 108 may determine that the request is suspicious and/or the control system is compromised. In some examples, such frequencies may be combined over a coarser discretized area such that they are representative of originations and destinations on the course of a block, a tenth of a mile, a quarter of a mile, and so forth.

In some instances, when making the determination, the authorization system 108 may use the data representing the routes taken by the passenger 130 associated with the request. For example, even if the frequency is less than or equal to the threshold frequency, the authorization system 108 may determine an additional frequency that the actual passenger 130 sends requests that include the pick-up location 126 and the destination location. In such an example, if the authorization system 108 determines that the additional frequency is less than or equal to the threshold frequency (and/or another threshold frequency), then the authorization system 108 may determine that the request is still suspicious and/or the control system is still compromised. However, if the authorization system 108 determines that the additional frequency is greater than the threshold frequency (and/or the other threshold frequency), then the authorization system 108 may determine that the request is actually not suspicious and/or the control system is actually not compromised.

The authorization system 108 may then perform one or more actions based on determining that a request is suspicious or the control system 106 is compromised. For a first example, the authorization system 108 may send, to a computing device associated with a teleoperator, an additional request to authorize the suspicious request. After sending the additional request, the authorization system 108 may receive, from the computing device associated with the teleoperator, data representing a control to send the vehicle to the pick-up location 126 (e.g., if the request is not suspicious) or a control to refrain from sending the vehicle to the pick-up location 126 (e.g., if the request is suspicious). For a second example, the authorization system 108 may send, to the computing device associated with the teleoperator, data indicating that the control system 106 is compromised. For a third example, the authorization system 108 may send, to the vehicle, control data 118 representing an instruction to navigate to a new pick-up location associated with a new request.

In some instances, the authorization system 108 may use data received from the control system 106 to determine whether the control system 106 is compromised. In the first example, and in circumstances where the control system 106 may be sending location data 144 that indicates an inaccurate location of the vehicle 102, the authorization system 108 may receive the location data 144 from the control system 106. The authorization system 108 may then determine the reported location 112 for the vehicle 102 as the inaccurate location indicated by the location data 144. Additionally, the authorization system 108 may receive data representing the sensor-based location 138 of the vehicle 102. In some instances, the authorization system 108 receives the data from the vehicle 102. For instance, the data may include sensor data 116 (e.g., location data) generated by a sensor (e.g., location sensor) of the vehicle, where the sensor data 116 represents the sensor-based location 138 of the vehicle 102. In some instances, the authorization system 108 receives the data from the user device 110. For instance, but not illustrated in the example of FIG. 1, the user device 110 may be located within the vehicle 102, and the data may include sensor data 116 indicating a current location of the user device 110. As such, the current location of the user device 110 may include the sensor-based location 138 of the vehicle 102.

The authorization system may then compare the reported location 112 of the vehicle 102 to the sensor-based location 138 of the vehicle 102. Based on the comparing, the authorization system 108 may determine whether the vehicle 102 is located at the reported location 112. In some instances, the authorization system 108 may determine that the vehicle 102 is located at the reported location 112 (e.g., the sensor-based location 138 matches the reported location 112) when the sensor-based location 138 is within a threshold distance to the reported location 112, but determine that the vehicle 102 is not located at the reported location 112 (e.g., the sensor-based location 138 does not match the reported location 112)

when the sensor-based location 138 is outside of the threshold distance to the reported location 112. If the authorization system 108 determines that the vehicle is located at the reported location 112, the authorization system 108 may determine that the control system 106 is authorized (e.g., not compromised). However, and in the example of FIG. 1, if the authorization system 108 determines that the vehicle 102 is not located at the reported location 112, the authorization system 108 may determine that the control system 106 is unauthorized (e.g., compromised).

For a second example, and in circumstances where the control system 106 may be sending location data 144 that indicates an accurate location of the vehicle 102, the authorization system 108 may again receive the location data 144 from the control system 106 (and/or the vehicle 102). In these circumstances, the location indicated by the location data 144 may include the sensor-based location 138 of the vehicle 102. The authorization system 108 may then determine the reported location for the vehicle 102. In some instances, the authorization system 108 determines the reported location using data received from the user device 110. For instance, the data may include the request data 122 sent by the user device 110, where the request data 122 indicates the pick-up location 126. The authorization system 108 may then determine the expected route 120 for the vehicle 102 using the initial location 124 of the vehicle 102 and the pick-up location 126. Using the expected route 120, the authorization system 108 may determine that the reported location 112 includes at least one location along the expected route 120.

The authorization system 108 may then compare the reported location 112 of the vehicle 102 to the sensor-based location 138 of the vehicle 102. For instance, the authorization system 108 may determine whether the sensor-based location 138 of the vehicle 102 is along the expected route 120. If the authorization system 108 determines that the sensor-based location 138 is along the expected route 120, then the authorization system 108 may determine that the control system 106 is authorized. However, and in the example of FIG. 1, if the authorization system 108 determines that the sensor-based location 138 is not along the expected route 120, then the authorization system 108 may determine that the control system 106 is not authorized.

In some instances, the authorization system 108 may perform one or more actions based on determining that the control system 106 is unauthorized. For a first example, the authorization system 108 may send, to the vehicle 102, control data 118 representing instructions(s) that cause the vehicle 102 to perform one or more maneuvers, such as stopping. In some instances, the authorization system 108 sends the control data 118 after the vehicle 102 reaches a current destination location. For a second example, the authorization system 108 may begin to perform similar techniques for other vehicles to confirm whether the control system 106 is unauthorized (e.g., to confirm whether the control system 106 is compromised, as may have been flagged by the first vehicle 102).

In some instances, the vehicle 102, the user device 110, and/or the additional vehicle 140 may perform similar processes as described above, with respect to the authorization system 108, to determine whether the control system 106 is authorized. In such instance, if the vehicle 102, the user device 110, and/or the additional vehicle 140 determines that the control system 106 is unauthorized, the vehicle 102, the user device 110, and/or the additional vehicle 140 may send, to the authorization system 108, authorization data 146 indicating that the control system 106 is unauthorized.

Although FIG. 1 illustrates the control system 106, the authorization system 108, and the vehicle 102 as being separate from one another, in other example, one or more of the control system 106, the authorization system 108, or the vehicle 102 may be combined. For example, the control system 106 and/or the authorization system 108 may be included in the vehicle 102.

Figure 2:
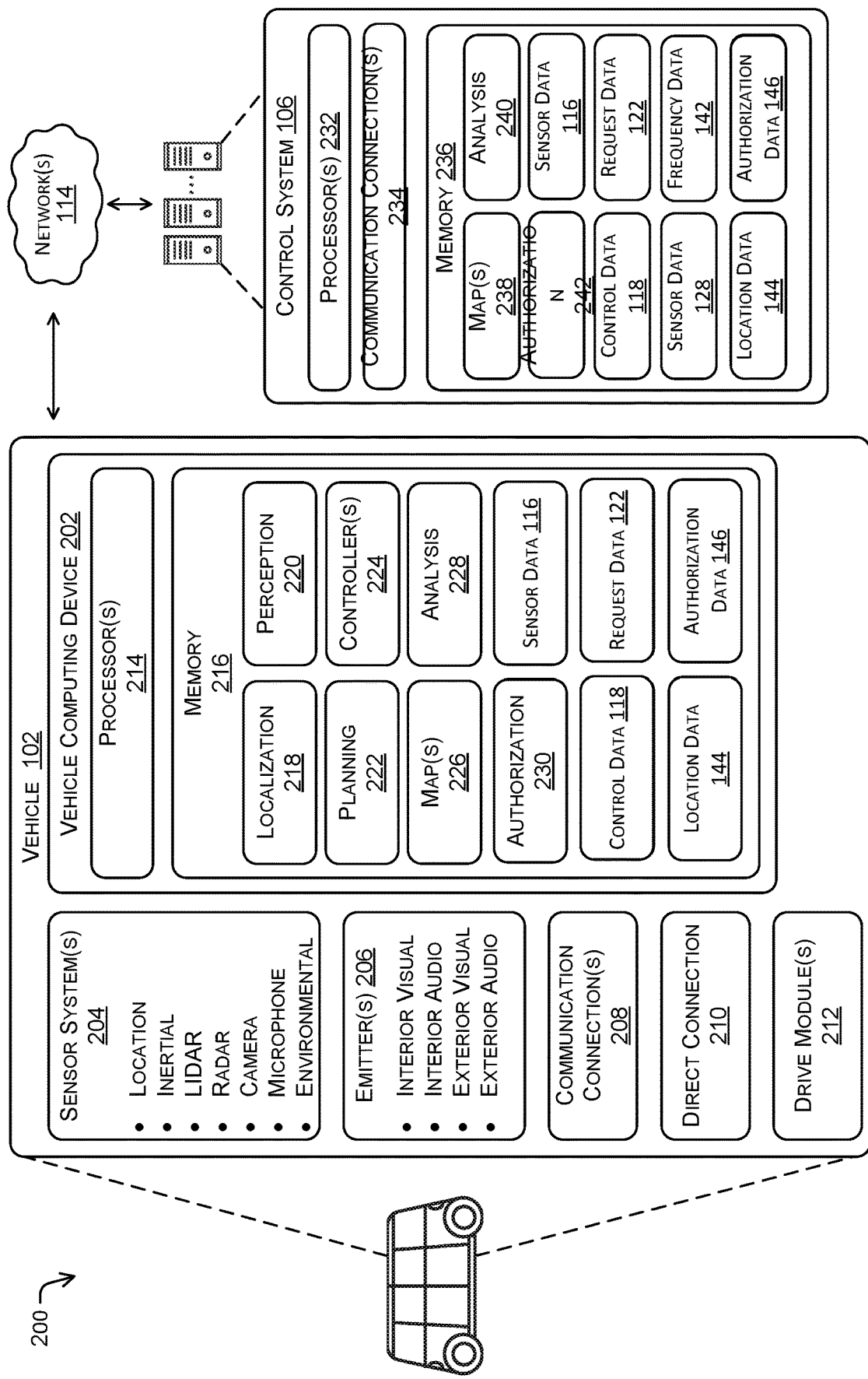
FIG. 2 depicts a block diagram of an example system for implementing the techniques described herein, in accordance with embodiments of the disclosure.

FIG. 2 depicts a block diagram of an example system 200 for implementing the techniques described herein, in accordance with embodiments of the disclosure. In at least one example, the system 200 can include the vehicle 102. The vehicle 102 can include a vehicle computing device 202, one or more sensor systems 204, one or more emitters 206, one or more communication connections 208, at least one direct connection 210, and one or more drive modules 212.

The vehicle computing device 202 can include one or more processors 214 and the memory 216 communicatively coupled with the one or more processors 214. In the illustrated example, the vehicle 102 is an autonomous vehicle. However, the vehicle 102 may be any other type of vehicle (e.g., a manually driven vehicle, a semi-autonomous vehicle, etc.), or any other system having at least an image capture device. In the illustrated example, the memory 216 of the vehicle computing device 202 stores a localization component 218, a perception component 220, a planning component 222, one or more system controllers 224, one or more maps 226 (which may represent, and/or be similar to, the map data 132), an analysis component 228, and an authorization component 230. Though depicted in FIG. 2 as residing in the memory 216 for illustrative purposes, it is contemplated that the localization component 218, the perception component 220, the planning component 222, the one or more system controllers 224, the one or more maps 226, the analysis component 228, and/or the authorization component 230 can additionally, or alternatively, be accessible to the vehicle 102 (e.g., stored on, or otherwise accessible by, memory remote from the vehicle 102).

In at least one example, the localization component 218 can include functionality to receive the sensor data 116 from the sensor system(s) 204 and to determine a position and/or orientation of the vehicle 102 (e.g., one or more of an x-, y-, z-position, roll, pitch, or yaw). For example, the localization component 218 can include and/or request/receive a map of an environment and can continuously determine a location and/or orientation of the vehicle 102 within the map. In some instances, the localization component 218 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 102. In some instances, the localization component 218 can provide data to various components of the vehicle 102 to determine an initial position of the vehicle 102 for generating a candidate trajectory, as discussed herein.

In some instances, the perception component 220 can include functionality to perform object detection, segmentation, and/or classification. In some instances, the perception component 220 can provide processed sensor data 116 that indicates a presence of an object that is proximate to the vehicle 102 and/or a classification of the object as an object type (e.g., car, pedestrian, cyclist, animal, building, tree, road surface, curb, sidewalk, unknown, etc.). In additional and/or alternative examples, the perception component 220 can provide processed sensor data 116 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 222 can determine a path for the vehicle 102 to follow to traverse through an environment. For example, the planning component 222 can determine various routes and trajectories and various levels of detail. For example, the planning component 222 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 222 can generate an instruction for guiding the vehicle 102 along at least a portion of the route from the first location to the second location. In at least one example, the planning component 222 can determine how to guide the vehicle 102 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 102 to navigate.

In at least one example, the planning component 222 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 102 can stop to pick up a passenger. In at least one example, the planning component 222 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

In at least one example, the vehicle computing device 202 can include one or more system controllers 224, which can be configured to control steering, propulsion, braking, safety, emitters, communication, and other systems of the vehicle 102. These system controller(s) 224 can communicate with and/or control corresponding systems of the drive module(s) 212 and/or other components of the vehicle 102.

The memory 216 can further include one or more maps 226 that can be used by the vehicle 102 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps 226 can include at least one map (e.g., images and/or a mesh). In some example, the vehicle 102 can be controlled based at least in part on the map(s) 226. That is, the map(s) 226 can be used in connection with the localization component 218, the perception component 220, and/or the planning component 222 to determine a location of the vehicle 102, identify entities in an environment, and/or generate routes and/or trajectories to navigate within an environment.

The analysis component 228 can analyze data (e.g., the sensor data 116, the map(s) 226, the request data 122, etc.), using the techniques described herein, to determine if the control system 106 is authorized. For example, the analysis component 228 can analyze first data to determine an reported location associated with the vehicle 102. In some instances, the first data may include control data 118 received from the control system 106, where the control data 118 indicates the reported location and/or a route that includes the reported location. In some instances, the first data may include request data 122 received from the user device 110, the control system 106, and/or the authorization system 108, where the request data 122 indicates the pickup location. For example, the analysis component 228 can determine a route from an initial location at which the vehicle 102 was located when receiving the request data to the pickup location indicated by the request data 122. The analysis component 228 can then determine that the reported location is along the route. Still, in some instances, the first data can include sensor data 116 generated by the sensor system(s) 204, such as GPS data, lidar data, camera data, IMU data, etc., that indicates the reported location.

The analysis component 228 can then analyze second data to determine an sensor-based location associated with the vehicle 102. In some instances, the second data can include sensor data 116 generated by the sensor system(s) 204, such as lidar data, camera data, GPS data, etc., that indicates the sensor-based location. In some instances, such as when the user device 110 is located within the vehicle 102, the second data can include sensor data 116 received from the user device 110, where the sensor data 116 indicates the location of the user device 110.

After determining the reported location and the sensor-based location, the analysis component 228 can determine if the vehicle 102 is located at the reported location. In some instances, the analysis component 228 may determine that the vehicle 102 is located at the reported location when the sensor-based location is within a threshold distance to the reported location. Additionally, the analysis component 228 may determine that the vehicle 102 is not located at the reported location when the sensor-based location is outside of the threshold distance to the reported location.

In some instances, to determine if the control system 106 is authorized, the analysis component 228 can analyze the sensor data 116 generated by the sensor system(s) 204 with respect to a portion of the map(s) 226, where the portion of the map(s) 226 represents the environment associated with the reported location. For example, the analysis component 228 can determine if feature(s) represented by the sensor data 116 match feature(s) represented by the portion of the map(s) 226. In some instances, the analysis component 228 may then determine that the vehicle 102 is located at the reported location when the feature(s) represented by the sensor data 116 match the feature(s) represented by the portion of the map(s) 226. Additionally, the analysis component 228 may determine that the vehicle 102 is not located at the reported location when the feature(s) represented by the sensor data 116 do not match the feature(s) represented by the portion of the map(s) 226.

The authorization component 230 can authorize the control system 106 based on the analysis performed by the analysis component 228. For example, the authorization component 230 may authorize the control system 106 when the vehicle 102 is located at the reported location, but not authorize the control system 106 when the vehicle 102 is not located at the reported location. In some instances, when the authorization component 230 does not authorize the control system 106, the vehicle 106 may send, to the authorization system 108, authorizing data 146 indicating that the control system 106 is not authorized.

In some instances, aspects of some or all of the components discussed herein can include any models, algorithms, and/or machine learning algorithms. For example, in some instances, the components in the memory 216 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 2 (ID2), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

As discussed above, in at least one example, the sensor system(s) 204 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 204 can include multiple instances of each of these or other types of sensors. For instance, the lidar sensors can include individual lidar sensors located at the corners, front, back, sides, and/or top of the vehicle 102. As another example, the camera sensors can include multiple cameras disposed at various locations about the exterior and/or interior of the vehicle 102. The sensor system(s) 204 can provide input to the vehicle computing device 202. Additionally or alternatively, the sensor system(s) 204 can send the sensor data 116, via the one or more networks 114, to the control system 106 at a particular frequency, after a lapse of a predetermined period of time, upon occurrence of one or more conditions, in near real-time, etc.

The vehicle 102 can also include one or more emitters 206 for emitting light and/or sound, as described above. The emitter(s) 206 in this example include interior audio and visual emitters to communicate with passengers of the vehicle 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 206 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 can also include one or more communication connection(s) 208 that enable communication between the vehicle 102 and one or more other local or remote computing device(s). For instance, the communication connection(s) 208 can facilitate communication with other local computing device(s) on the vehicle 102 and/or the drive module(s) 212. Also, the communication connection(s) 208 can allow the vehicle 102 to communicate with other nearby computing device(s) (e.g., other nearby vehicles, traffic signals, etc.). The communications connection(s) 208 also enable the vehicle 102 to communicate with a remote teleoperations computing device or other remote services.

The communications connection(s) 208 can include physical and/or logical interfaces for connecting the vehicle computing device 202 to another computing device or a network, such as network(s) 114. For example, the communications connection(s) 208 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

In at least one example, the vehicle 102 can include one or more drive modules 212. In some instances, the vehicle 102 can have a single drive module 212. In at least one example, if the vehicle 102 has multiple drive modules 212, individual drive modules 212 can be positioned on opposite ends of the vehicle 102 (e.g., the front and the rear, etc.). In at least one example, the drive module(s) 212 can include one or more sensor systems to detect conditions of the drive module(s) 212 and/or the surroundings of the vehicle 102. By way of example and not limitation, the sensor system(s) 204 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect entities in the surroundings of the drive module, lidar sensors, radar sensors, etc. Some sensors, such as the wheel encoders can be unique to the drive module(s) 212. In some cases, the sensor system(s) 204 on the drive module(s) 212 can overlap or supplement corresponding systems of the vehicle 102 (e.g., sensor system(s) 204).

The drive module(s) 212 can include many of the vehicle systems, including a high voltage battery, a motor to propel the vehicle 102, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 212 can include a drive module controller which can receive and preprocess the sensor data 116 from the sensor system(s) 204 and to control operation of the various vehicle systems. In some instances, the drive module controller can include one or more processors and memory communicatively coupled with the one or more processors. The memory can store one or more modules to perform various functionalities of the drive module(s) 212. Furthermore, the drive module(s) 212 also include one or more communication connection(s) that enable communication by the respective drive module with one or more other local or remote computing device(s).

In at least one example, the direct connection 210 can provide a physical interface to couple the one or more drive module(s) 212 with the body of the vehicle 102. For example, the direct connection 210 can allow the transfer of energy, fluids, air, data, etc. between the drive module(s) 212 and the vehicle 102. In some instances, the direct connection 210 can further releasably secure the drive module(s) 212 to the body of the vehicle 102.

As further illustrated in FIG. 2, the control system 106 can include processor(s) 232, communication connection(s) 234, and memory 236. In the illustrated example, the memory 236 stores one or more maps 238 (which may represent, and/or be similar to, the map(s) 226 and/or the map data 132), an analysis component 240, and an authorization component 242. The analysis component 240 can analyze data (e.g., the sensor data 116, the map(s) 226, the request data 122, etc.), using the techniques described herein, to determine if the vehicle 102 is compromised. For example, the analysis component 240 can analyze first data to determine an reported location associated with the vehicle 102. In some instances, the first data may include control data 118 sent to the vehicle 102, where the control data 118 indicates the reported location and/or a route that includes the reported location. In some instances, the first data may include request data 122 received from the user device 110 and/or the authorization system 108, where the request data 122 indicates the pickup location. For example, the analysis component 240 can determine a route from an initial location at which the vehicle 102 was located when receiving the request data 122 to the pickup location indicated by the request data 122. The analysis component 240 can then determine that the reported location is along the route. Still, in some instances, the first data can include sensor data 116 generated by the sensor system(s) 204, such as GPS data, lidar data, camera data, IMU data, etc., that indicates the reported location.

The analysis component 240 can then analyze second data to determine an sensor-based location associated with the vehicle 102. In some instances, the second data can include sensor data 116 generated by the sensor system(s) 204, such as GPS data, that indicates the sensor-based location. In some instances, such as when the user device 110 is located within the vehicle 102, the second data can include sensor data 116 received from the user device 110, where the sensor data 116 indicates the location of the user device 110.

After determining the reported location and the sensor-based location, the analysis component 240 can determine if the vehicle 102 is located at the reported location. In some instances, the analysis component 240 may determine that the vehicle 102 is located at the reported location when the sensor-based location is within a threshold distance to the reported location. Additionally, the analysis component 240 may determine that the vehicle 102 is not located at the reported location when the sensor-based location is outside of the threshold distance to the reported location.

In some instances, to determine if the vehicle 102 is compromised, the analysis component 240 can analyze the sensor data 116 generated by the sensor system(s) 204 with respect to a portion of the map(s) 238, where the portion of the map(s) 238 represents the environment associated with the reported location. For example, the analysis component 240 can determine if feature(s) represented by the sensor data 116 match feature(s) represented by the portion of the map(s) 238. In some instances, the analysis component 240 may then determine that the vehicle 102 is located at the reported location when the feature(s) represented by the sensor data 116 match the feature(s) represented by the portion of the map(s) 238. Additionally, the analysis component 240 may determine that the vehicle 102 is not located at the reported location when the feature(s) represented by the sensor data 116 do not match the feature(s) represented by the portion of the map(s) 238.

The authorization component 242 can authorize the vehicle 102 based on the analysis performed by the analysis component 240. For example, the authorization component 242 may authorize the vehicle 102 when the vehicle 102 is located at the reported location, but not authorize the vehicle 102 when the vehicle 102 is not located at the reported location. In some instances, when the authorization component 242 does not authorize the vehicle 102, the control system 106 may perform one or more actions, which are described herein.

The processor(s) 214 of the vehicle 102 and/or the processor(s) 232 of the control system 106 (and/or other processor(s) described herein) can be any suitable processor capable of executing instructions to process data and perform operations as described herein. By way of example and not limitation, the processor(s) 214 and 232 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

Memory 216 and memory 236 (and/or other memory described herein) are examples of non-transitory computer-readable media. The memory 216 and memory 236 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 102 can be associated with the control system 106 and/or components of the control system 106 can be associated with the vehicle 102. That is, the vehicle 102 can perform one or more of the functions associated with the control system 106, and vice versa.

Figure 3:
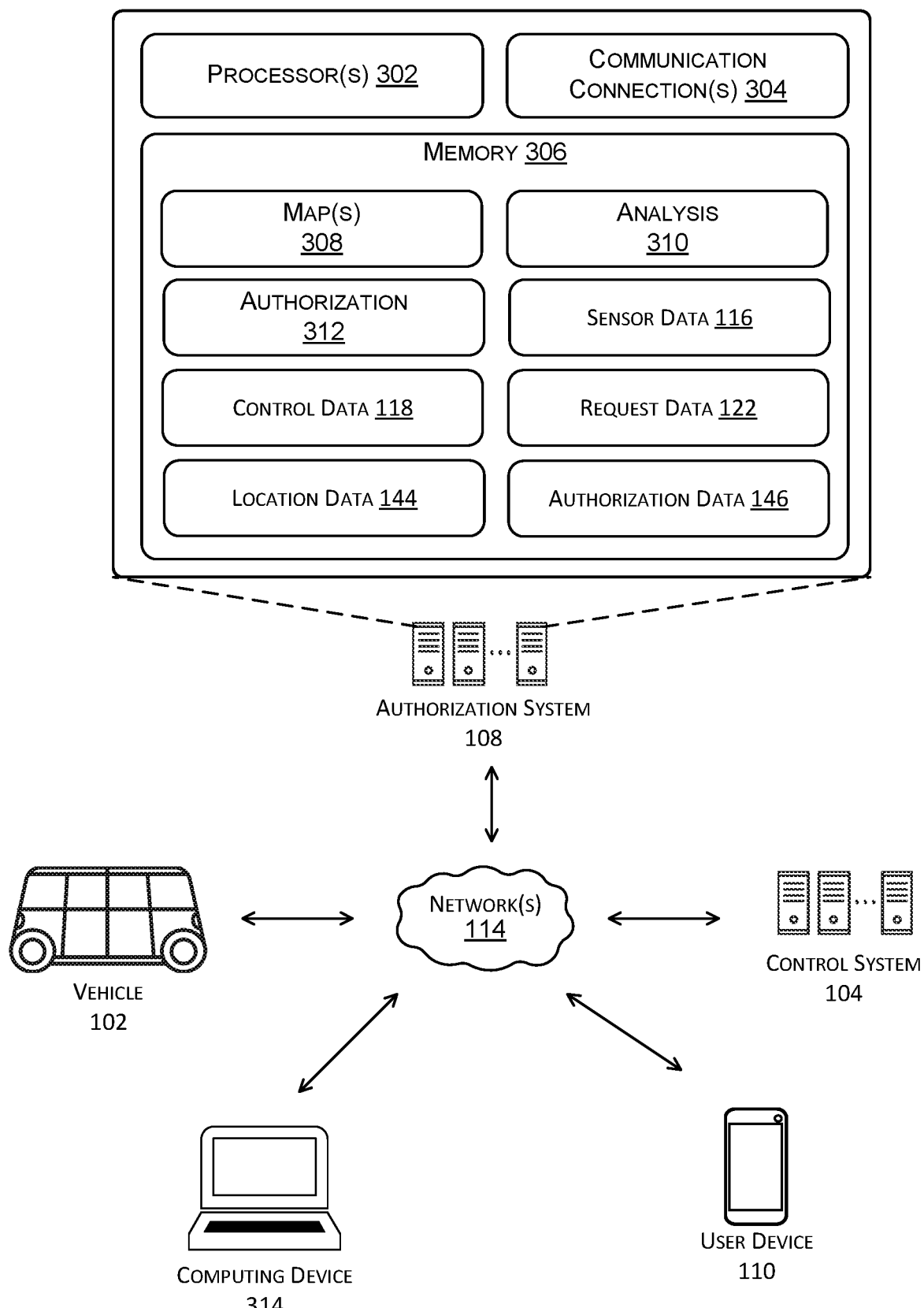
FIG. 3 depicts a block diagram of an example authorization system that implements the techniques described herein, in accordance with embodiments of the disclosure.

FIG. 3 depicts a block diagram of the authorization system 108 that implements the techniques described herein, in accordance with embodiments of the disclosure. As shown, the authorization system 108 can include processor(s) 302, communication connection(s) 304, and memory 306. In the illustrated example, the memory 306 stores one or more maps 308 (which may represent, and/or be similar to, the map(s) 238, the map(s) 226, and/or the map data 132), an analysis component 310, and an authorization component 312.

The analysis component 310 can analyze data (e.g., the sensor data 116, the map(s) 308, the request data 122, etc.), using the techniques described herein, to determine if the control system 104 is authorized. For example, the analysis component 310 can analyze first data to determine an reported location associated with the vehicle 102. In some instances, the first data may include control data 118 sent to the vehicle 102 from the control system 106, where the control data 118 indicates the reported location and/or a route that includes the reported location. In some instances, the first data may include request data 122 received from the user device 110 and/or the control system 106, where the request data 122 indicates the pickup location. For example, the analysis component 310 can determine a route from an initial location at which the vehicle 102 was located when receiving the request data 122 to the pickup location indicated by the request data 122. The analysis component 310 can then determine that the reported location is along the route. Still, in some instances, the first data can include sensor data 116 generated by the sensor system(s) 204, such as GPS data, that indicates the reported location.

The analysis component 310 can then analyze second data to determine a sensor-based location associated with the vehicle 102. In some instances, the second data can include sensor data 116 generated by the sensor system(s) 204, such as GPS data, lidar data, camera data, IMU data, etc., that indicates the sensor-based location. In some instances, such as when the user device 110 is located within the vehicle 102, the second data can include sensor data 116 received from the user device 110, where the sensor data 116 indicates the location of the user device 110.

After determining the reported location and the sensor-based location, the analysis component 310 can determine if the vehicle 102 is located at the reported location. In some instances, the analysis component 310 may determine that the vehicle 102 is located at the reported location when the sensor-based location is within a threshold distance to the reported location. Additionally, the analysis component 310 may determine that the vehicle 102 is not located at the reported location when the sensor-based location is outside of the threshold distance to the reported location.

In some instances, to determine if the control system 106 is authorized, the analysis component 310 can analyze the sensor data 116 generated by the sensor system(s) 204 with respect to a portion of the map(s) 308, where the portion of the map(s) 308 represents the environment associated with the reported location. For example, the analysis component 310 can determine if feature(s) represented by the sensor data 116 match feature(s) represented by the portion of the map(s) 308. In some instances, the analysis component 310 may then determine that the vehicle 102 is located at the reported location when the feature(s) represented by the sensor data 116 match the feature(s) represented by the portion of the map(s) 308. Additionally, the analysis component 310 may determine that the vehicle 102 is not located at the reported location when the feature(s) represented by the sensor data 116 do not match the feature(s) represented by the portion of the map(s) 308.

The authorization component 312 can authorize the control system 106 based on the analysis performed by the analysis component 310. For example, the authorization component 312 may authorize the control system 106 when the vehicle 102 is located at the reported location, but not authorize the control system 106 when the vehicle 102 is not located at the reported location. In some instances, when the authorization component 312 does not authorize the control system 106, the authorization system 108 may perform one or more actions, which are described herein. In some instances, the authorization system 108 may send, to the control system 106, the vehicle 102, and/or another system, data indicating the location of the vehicle 102 as determined by the authorization system 108.

In some instances, the authorization system 108 may perform one or more of the processes described above with respect to the control system 106 to determine if the vehicle 102 is authorized. If the authorization system 108 determines that the vehicle 102 is not authorized, the authorization system 108 may send, to the control system 106, authorization data 146 indicating that the vehicle 102 is not authorized.

As further illustrated in FIG. 3, the authorization system 108 may communicate with a computing device 314 associated with a teleoperator. For instance, based on determining that a request is suspicious, the authorization system 108 may send, to the computing device 314, data representing an additional request to authorize the suspicious request. The teleoperator may then attempt to authorize the suspicious request. For a first example, the teleoperator may attempt to contact a passenger associated with the request to authorize the request. For a second example, the teleoperator may perform an additional analysis on the request to determine if the request is authorized. In either example, the authorization system 108 may receive, from the computing device 314, data indicating if the request is authorized.

Figure 4:
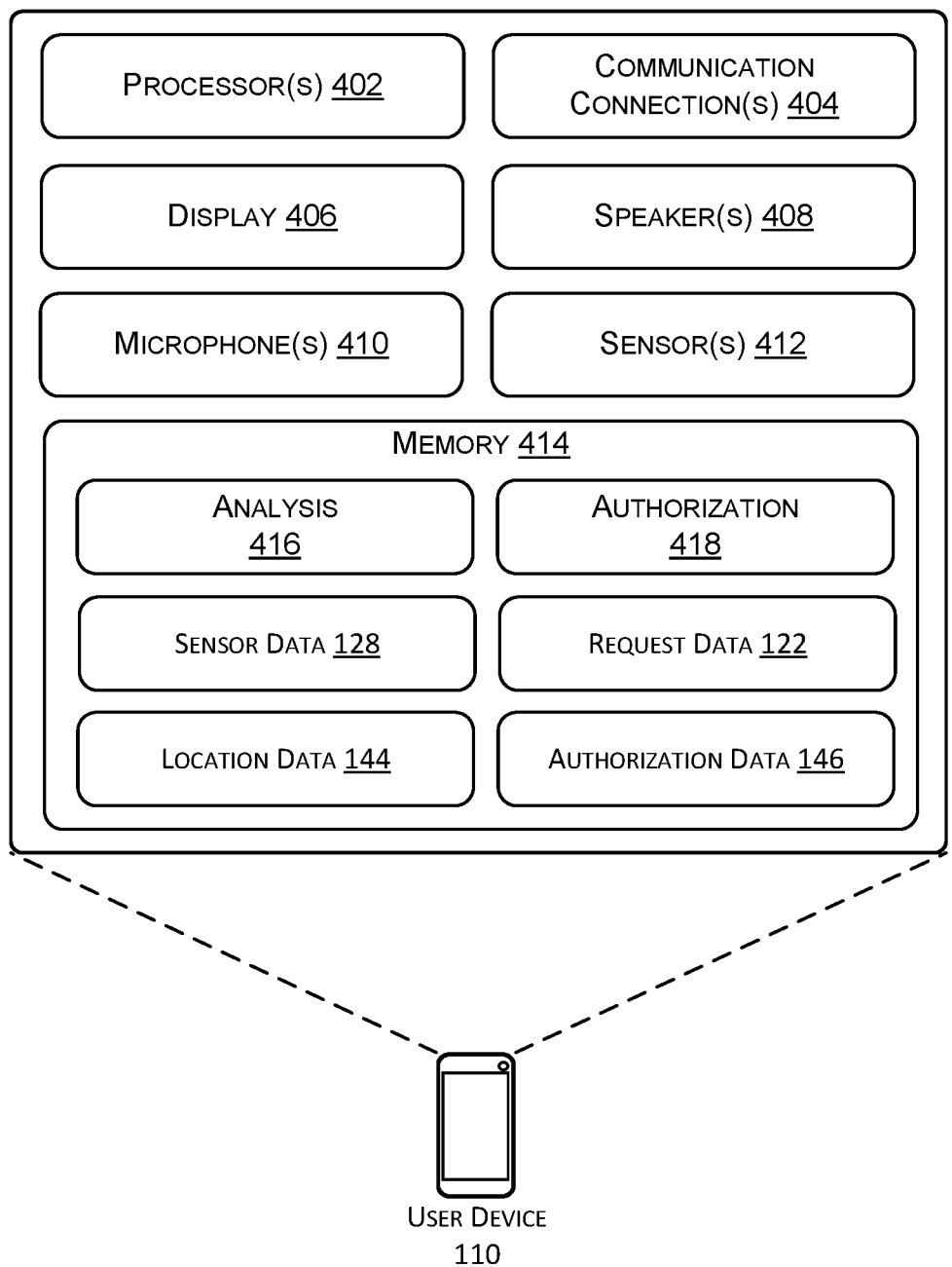
FIG. 4 depicts a block diagram of an example user device that implements the techniques described herein, in accordance with embodiments of the disclosure.

FIG. 4 depicts a block diagram of the user device 110 that implements the techniques described herein, in accordance with embodiments of the disclosure. As shown, the user device 110 includes processor(s) 402, communication connection(s) 404, a display 406, speaker(s) 408, microphone(s) 410, sensor(s) 412, and memory 414. The memory 414 stores at least an analysis component 416 and an authorization component 418.

The analysis component 416 can analyze data (e.g., the sensor data 116, the request data 122, etc.), using the techniques described herein, to determine if the control system 104 and/or the vehicle 102 is authorized. For example, the analysis component 416 can analyze first data to determine an reported location associated with the vehicle 102. In some instances, the first data may include request data 122 generated by the user device 110, where the request data 122 indicates the pickup location. For example, the analysis component 416 can determine a route from an initial location at which the vehicle 102 was located when sending the request data 122 to the pickup location indicated by the request data 122. The analysis component 416 can then determine that the reported location is along the route. In some instances, the first data can include sensor data 116 generated by the sensor system(s) 204, such as GPS data, that indicates the reported location. Still, in some instances, the first data can include location data 144 received from the control system 106, where the location data 144 indicates the reported location.

The analysis component 416 can then analyze second data to determine an sensor-based location associated with the vehicle 102. In some instances, the second data can include sensor data 116 generated by the sensor system(s) 204, such as GPS data, lidar data, camera data, IMU data, etc., that indicates the sensor-based location. In some instances, such as when the user device 110 is located within the vehicle 102, the second data can include sensor data 116 generated by the sensor(s) 412, where the sensor data 116 indicates the location of the user device 110.

After determining the reported location and the sensor-based location, the analysis component 416 can determine if the vehicle 102 is located at the reported location. In some instances, the analysis component 416 may determine that the vehicle 102 is located at the reported location when the sensor-based location is within a threshold distance to the reported location. Additionally, the analysis component 416 may determine that the vehicle 102 is not located at the reported location when the sensor-based location is outside of the threshold distance to the reported location.

The authorization component 418 can authorize the control system 106 and/or the vehicle 102 based on the analysis performed by the analysis component 416. For example, the authorization component 312 may authorize the control system 106 and/or the vehicle 102 when the vehicle 102 is located at the reported location, but not authorize the control system 106 and/or the vehicle 102 when the vehicle 102 is not located at the reported location. In some instances, when the authorization component 418 does not authorize the control system 106 and/or the vehicle 102, the user device 110 may perform one or more actions, which are described herein. For a first example, the user device 110 may send, to the control system 106 and/or the authorization system 108, authorization data 146 indicating that the vehicle 102 is not authorized. For a second example, the user device 110 may send, to the vehicle 102 and/or the authorization system 108, authorization data 146 indicating that the control system 106 is not authorized.

FIGS. 5-8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
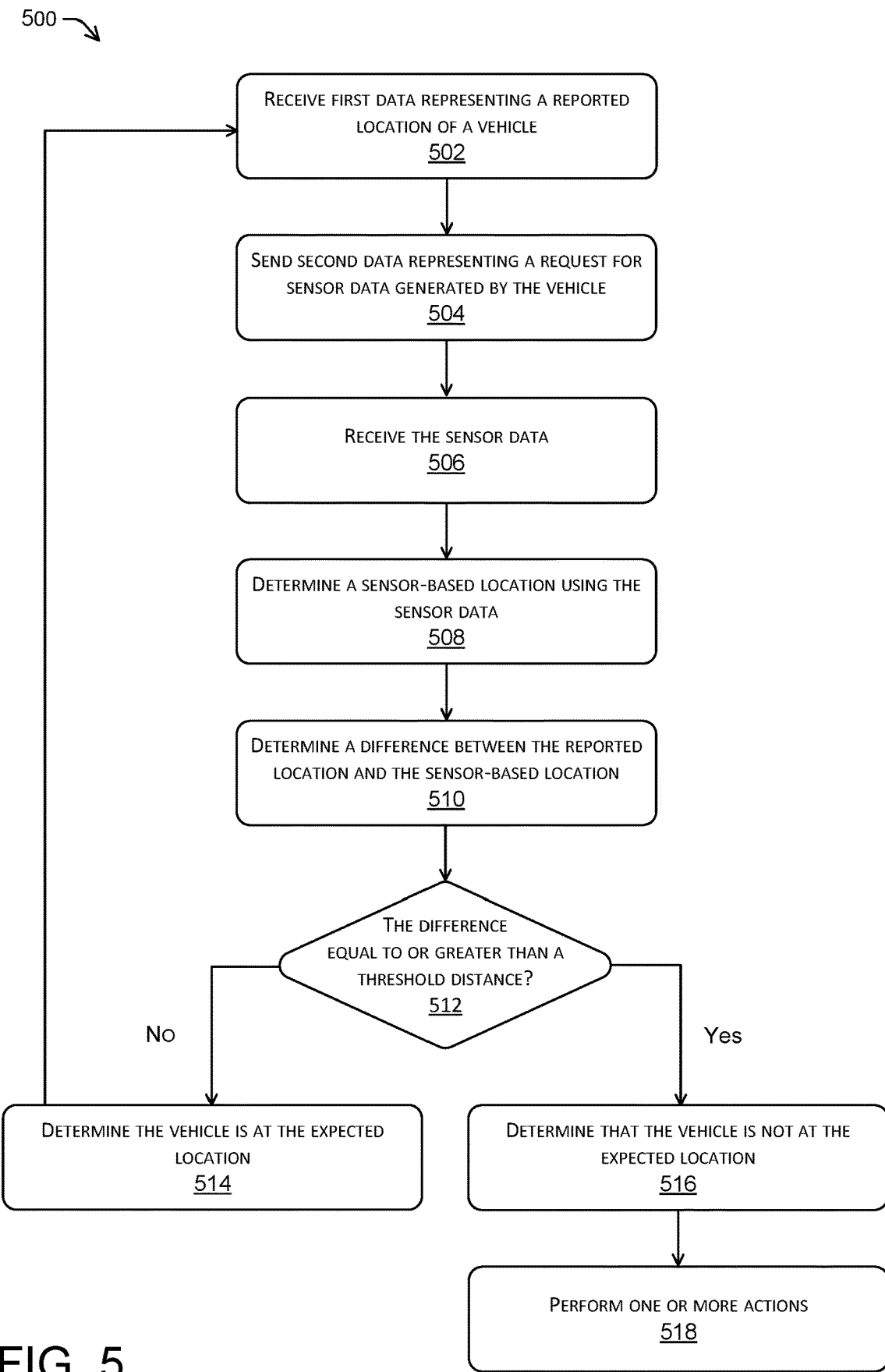
FIG. 5 depicts an example process for determining whether a vehicle is compromised, according to embodiments of the present disclosure.

FIG. 5 depicts an example process 500 for determining whether a vehicle is compromised, according to embodiments of the present disclosure. At operation 502, the process 500 may include receiving first data representing a reported location of a vehicle. For instance, the control system 106 may receive the first data representing the reported location of the vehicle 102. In some instances, the first data includes request data received from the user device 110. In some instances, the first data includes sensor data received from the vehicle 102.

At operation 504, the process 500 may include sending second data representing a request for sensor data generated by the vehicle 102. For instance, the control system 106 may sending, to the vehicle 102, the second data representing the request for the sensor data. In some instances, the request may indicate a type of sensor data and/or a sensor for generating the sensor data.

At operation 506, the process 500 may include receiving the sensor data. For instance, the control system 106 may receive the sensor data from the vehicle 102. In some instances, the sensor data may include, but is not limited to, image data generated by a camera, lidar data generated by a lidar senor, location data generated by a location sensor, and/or the like.

At operation 508, the process 500 may include determining a sensor-based location using the sensor data. For instance, the control system 106 may use the sensor data to determine the sensor-based location of the vehicle 102. In some instances, the control system 106 determines the sensor-based location by analyzing the sensor data using map data, which is described herein. Based on the analysis, the control system 106 determines the sensor-based location.

At operation 510, the process 500 may include determining a difference between the reported location and the sensor-based location. For instance, the control system 106 may determine the difference between the reported location and the sensor-based location. In some instances, the difference is in the x-position, the y-position, and/or the z-position between the reported location and the sensor-based location. Additionally, or alternatively, in some instances, the difference is in the roll, pitch, or yaw between the reported location and the sensor-based location.

At operation 512, the process 500 may include determining whether the difference is equal to or greater than a threshold distance. For instance, the control system 106 may determine whether the difference is equal to or greater than the threshold distance. In some instance, the threshold distance may be in the x-position, the y-position, and/or the z-position. Additionally, or alternatively, in some instance, the difference may in the roll, the pitch, and/or the yaw.

If, at operation 512, the process 500 determines that the difference is not equal to or greater than the threshold distance (e.g., is less than the threshold distance), then at operation 514, the process 500 may include determining that the vehicle is at the reported location. For instance, if the control system 106 determines that the difference is less than the threshold distance, then the control system 106 may determine that the vehicle 102 is at the reported location. Additionally, the control system 106 may determine that the vehicle 102 is authorized and/or not compromised. Furthermore, the process may repeat back at operation 502.

However, if, at operation 512, the process 500 determines that the difference is equal to or greater than the threshold distance, then at operation 516, the process 500 may include determining that the vehicle is not at the reported location. For instance, if the control system 106 determines that the difference is equal to or greater than the threshold distance, then the control system 106 may determine that the vehicle 102 is not at the reported location. Additionally, the control system 106 may determine that the vehicle 102 is unauthorized and/or compromised.

At operation 518, the process 500 may include performing one or more actions. For instance, based on determining that the vehicle 102 is not located at the reported location, the control system 106 may perform the one or more actions. For a first example, the control system 106 may send, to the vehicle 102, control data representing instructions to perform a maneuver, such as stopping. For a second example, the control system 106 may send, to the other vehicle, control data representing an instruction to navigate to the reported location and/or an sensor-based location of the vehicle. While these are just a couple of examples of actions that may be performed by the control system 106, in other examples, the control system 106 may perform one or more additional and/or alternative actions.

Although the above examples describe the control system 106 as performing the process 500 of FIG. 5, in other examples, another computing device may perform the process 500 of FIG. 5. For example, the authorization system 108 and/or the user device 110 may perform the process 500 of FIG. 5 in order to determine whether the vehicle 102 is authorized.

Figure 6:
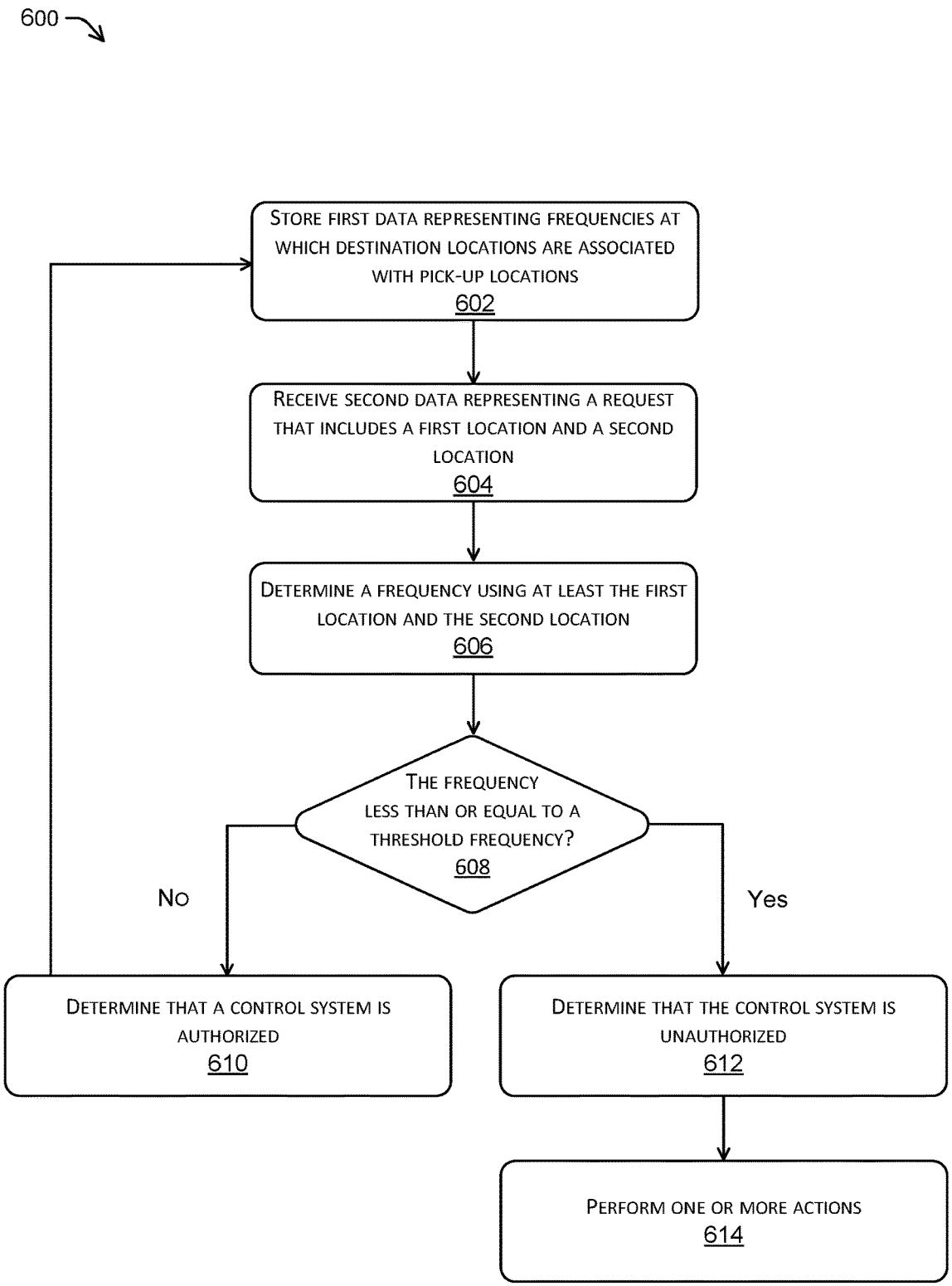
FIG. 6 depicts an example process for determining whether a control system is compromised using history data, according to embodiments of the present disclosure.

FIG. 6 depicts an example process 600 for determining whether a control system is compromised using history data, according to embodiments of the present disclosure. At operation 602, the process 600 may include storing first data representing frequencies at which destination locations are associated with pick-up locations. For instance, the authorization system 108 may store the first data for the fleet of vehicles, where the first data represents the frequencies. In some instances, the first data is generated using history data indicating routes taken by the fleet of vehicles, where the routes include pick-up locations and destination locations. In some instances, a destination location is associated with a pick-up location when a route started at the pick-up location and ended at the destination location. In at least some examples, such information may be combined over various geographic regions (e.g., within a threshold distance, a block, etc.).

At operation 604, the process 600 may include receiving second data representing a request that includes a first location and a second location. For instance, the authorization system 108 may receive the second data representing the request. In some instance, the request is for a passenger to be picked up at the first location and dropped off at the second location.

At operations 606, the process 600 may include determining a frequency using at least the first location and the second location. For instance, the authorization system 108 may determine that the first location is associated with a pick-up location from the first data and the second location is associated with a destination location from the first data, where the destination location is associated with the pick-up location. In some instances, the authorization system 108 determines that the first location is associated with the pick-up location when the first location is within a threshold distance to the pick-up location, and the authorization system 108 determines that the second location is associated with the destination location when the second location is within a threshold distance to the destination location. Based on the determinations, the authorization system 108 may identify the frequency that corresponds to the pick-up location and destination location pair.

At operation 608, the process 600 may include determining whether the frequency is less than or equal to a threshold frequency. For instance, the authorization system 108 may determine whether the frequency is less than or equal to the threshold frequency.

If, at operation 608, the process 600 determines that the frequency is greater than the threshold frequency, then at operation 610, the process 600 may include determining that a control system is authorized, or otherwise likely suspicious. For instance, if the authorization system 108 determines that the frequency is greater than the threshold frequency, then the authorization system 108 may determine that the control system 106 is authorized. In other words, the authorization system 108 may determine that the control system 106 is not compromised. In some instances, the process 600 may then repeat back at operations 602.

However, if, at operation 608, the process 600 determines that the frequency is less than or equal to the threshold frequency, then at operation 612, the process 600 may include determining that the control system is unauthorized. For instance, if the authorization system 108 determines that the frequency is less than or equal to the threshold frequency, then the authorization system 108 may determine that the control system 106 is unauthorized. In other words, the authorization system 108 may determine that the control system 106 is compromised and/or the request is suspicious. In at least some examples, operation 612 may use additional data (e.g., historical data about the particular passenger) to further verify a likelihood that the request is valid. In such examples, a frequency associated the passenger may be compared to the request and, if lower than a second threshold frequency, such a likelihood may be confirmed.

At operation 614, the process 600 may include performing one or more actions. For instance, based on determining that the control system 106 is unauthorized (or, likely malicious), the authorization system 108 may perform the one or more actions. For a first example, the authorization system 108 may send, to the computing device 314 associated with the teleoperator, data indicating that the control system is unauthorized and/or compromised. For a second example, the authorization system 108 may send, to the computing device 314 associated with the teleoperator, data representing an additional request to authorize the request for the ride. Still, for a third example, the authorization system 108 may send, to the vehicle 102, data representing an instruction to navigate to a new pick-up location.

Although the above examples describe the authorization system 108 as performing the process 600 of FIG. 6, in other examples, another computing device may perform the process 600 of FIG. 6. For example, the vehicle 102 and/or the user device 110 may perform the process 600 of FIG. 6 in order to determine whether the control system 106 is authorized.

Figure 7:
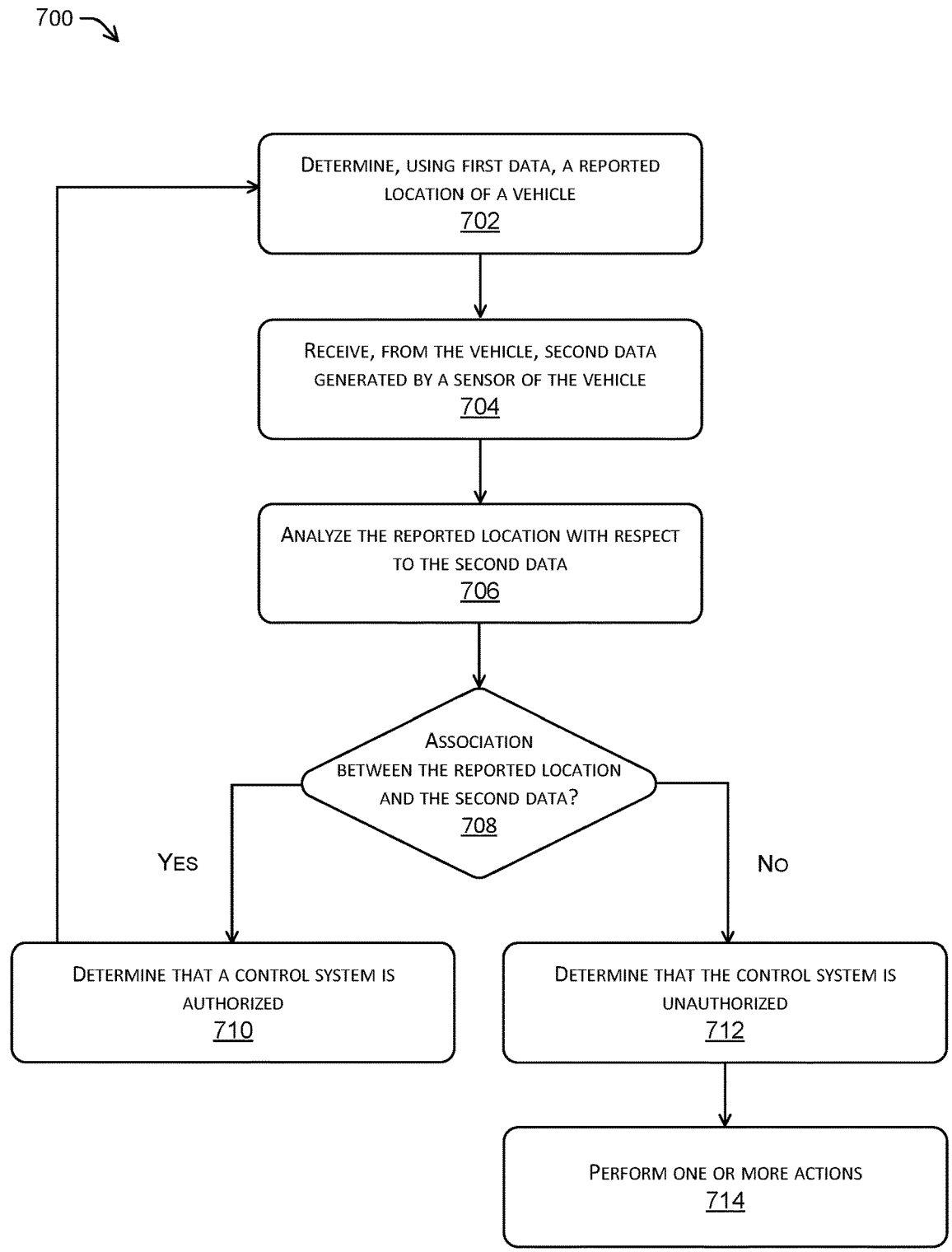
FIG. 7 depicts an example process for determining whether a control system is authorized when the control system is sending data representing an inaccurate location of a vehicle, according to embodiments of the present disclosure.

FIG. 7 depicts an example process 700 for determining whether a control system is authorized when the control system is sending data representing an inaccurate location of a vehicle, according to embodiments of the present disclosure. At operation 702, the process 700 may include determining, using first data, a reported location of a vehicle. For instance, the authorization system 108 may determine, using the first data, the reported location of the vehicle 102. In some instances, the first data includes location data received from the control system 106, where the location data indicates the reported location. In some instances, the first data includes control data received from the control system 106, where the control data indicates an instruction for the vehicle 102 to navigate along a route that includes the reported location. Still, in some instances, the first data includes request data received from the user device 110, where the request data represents a request for the vehicle 102 at a pickup location. In such instances, the authorization system 108 may determine a route from an initial location of the vehicle 102 to the pickup location, where the reported location is along the route.

At operation 704, the process 700 may include receiving, from the vehicle, second data generated by a sensor of the vehicle. For instance, the control system 106 may receive, from the vehicle 102, the second data generated by the sensor of the vehicle 102. In some instances, the second data includes location data generated by a location sensor of the vehicle 102, where the location data indicates (or is otherwise used to determine) an sensor-based location of the vehicle 102. In some instances, the second data includes other types of sensor data, such as image data generated by a camera of the vehicle 102, lidar data generated by a lidar sensor of the vehicle 102, and/or the like.

At operation 706, the process 700 may include analyzing the reported location with respect to the second data. For instance, the authorization system 108 may analyze the reported location with respect to the second data. In some instances, the analyzing may include comparing the reported location to the sensor-based location indicated by the second data. In some instances, the analyzing may include comparing feature(s) represented by a portion of map data that represents the reported location to feature(s) represented by the second data.

At operation 708, the process 700 may include determining whether there is an association between the reported location and the second data. For instance, the authorization system 108 may determine whether there is the association between the reported location and the second data. In some instances, the authorization system 108 may determine that there is the association when the reported location matches the sensor-based location, but determine that there is not the association when the reported location does not match the sensor-based location. In some instances, the authorization system 108 may determine that there is the association when the feature(s) represented by the portion of the map data match the feature(s) represented by the second data, but determine that there is not the association when the feature(s) represented by the portion of the map data do not match the feature(s) represented by the second data.

If, at operation 708, the process 700 determines that there is the association between the reported location and the second data, then at operation 710, the process 700 may include determining that a control system is authorized. For instance, if the authorization system 108 determines that there is the association between the reported location and the second data, then the authorization system 108 may determine that the control system 106 is authorized. In other words, the authorization system 108 may determine that the control system 106 is not compromised. In some instances, the process 700 may then repeat back at operations 702.

However, if, at operation 708, the process 700 determines that there is not the association between the reported location and the second data, then at operation 712, the process 700 may include determining that the control system is unauthorized. For instance, if the authorization system 108 determines that there is not the association between the reported location and the second data, then the authorization system 108 may determine that the control system 106 is unauthorized. In other words, the authorization system 108 may determine that the control system 106 is compromised.

At operation 714, the process 700 may include performing one or more actions. For instance, based on determining that the control system 106 is unauthorized, the authorization system 108 may perform the one or more actions. For a first example, the authorization system 108 may send, to the vehicle 102, control data representing instruction(s) to perform a maneuver, such as stopping. For a second example, the authorization system 108 may send, to other vehicle(s), control data representing instructions to perform maneuvers, such as stopping or confirming the presence of the first vehicle. Still, for a third example, the authorization system 108 may perform similar techniques using data associated with other vehicle(s) in order to verify that the control system 106 is unauthorized. While these are just a couple of examples of actions that may be performed by the authorization system 108, in other examples, the authorization system 108 may perform one or more additional and/or alternative actions.

Although the above examples describe the authorization system 108 as performing the process 700 of FIG. 7, in other examples, another computing device may perform the process 700 of FIG. 7. For example, the vehicle 102 and/or the user device 110 may perform the process 700 of FIG. 7 in order to determine whether the control system 106 is authorized.

Figure 8:
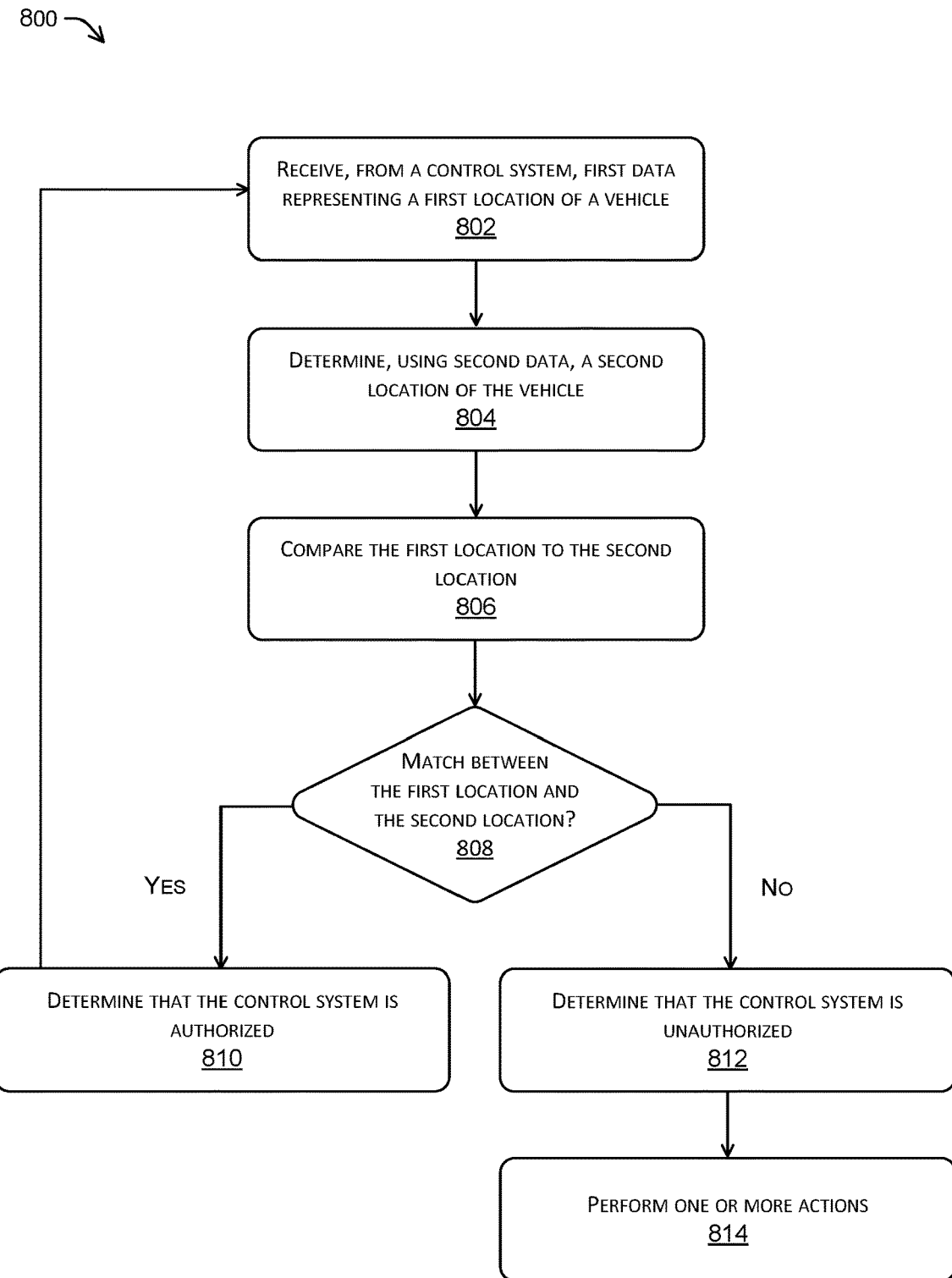
FIG. 8 depicts an example process for determining whether a control system is authorized when the control system is sending data representing an accurate, but unauthorized, location of a vehicle, according to embodiments of the present disclosure.

FIG. 8 depicts an example process 800 for determining whether a control system is authorized when the control system is sending data representing an accurate, but unauthorized, location of a vehicle, according to embodiments of the present disclosure. At operation 802, the process 800 may include receiving, from a control system, first data representing a first location of a vehicle. For instance, the authorization system 108 may receive, from the control system 106, the first data representing the first location of the vehicle 102. The first location may include the actual, but unauthorized, location of the vehicle. In some instances, the authorization system 108 continuously receives the first data from the control system 106. In some instances, the authorization system 108 receives the first data from the control system 106 at given time intervals. Still, in some instances, the authorization system 108 receives the first data from the control system 106 based on sending, to the control system 106, data representing a request for the first data.

At operations 804, the process 800 may include determining, using second data, a second location of the vehicle. For instance, the authorization system 108 may determine, using the second data, the second location of the vehicle 102, where the second location includes an reported location for the vehicle 102. In some instances, the second data may include request data received from the user device 110, where the request data represents a request for the vehicle 102 at a pickup location. For instance, the authorization system 108 may use an initial location for the vehicle 102, which is determined when the user device 110 sent the request data, and the pickup location to determine a route for the vehicle 102. The authorization system 108 may then determine that the second location should be along the route.

At operation 806, the process 800 may include comparing the first location to the second location. For instance, the authorization system 108 may compare the first location to the second location.

At operation 808, the process 800 may include determining whether there is a match between the first location and the second location. For instance, based on the comparing, the authorization system 108 may determine whether there is the match between the first location and the second location. In some instances, the authorization system 108 may determine that there is the match when the first location is within a threshold distance to the second location, but determine that there is not the match when the first location is outside of the threshold distance to the second location.

If, at operation 808, the process 800 determines that there is the match between the first location and the second location, then at operation 810, the process 800 may include determining that the control system is authorized. For instance, if the authorization system 108 determines that there is the match between the first location and the second location, then the authorization system 108 may determine that the control system 106 is authorized. In other words, the authorization system 108 may determine that the control system 106 is not compromised. Furthermore, the process 800 may repeat back at operations 802.

However, if, at operation 808, the process 800 determines that there is not the match between the first location and the second location, then at operation 812, the process 800 may include determining that the control system is unauthorized. For instance, if the authorization system 108 determines that there is not the match between the first location and the second location, then the authorization system 108 may determine that the control system 106 is unauthorized. In other words, the authorization system 108 may determine that the control system 106 is compromised.

At operation 814, the process 800 may include performing one or more actions. For instance, based on determining that the control system 106 is unauthorized, the authorization system 108 may perform the one or more actions. For a first example, the authorization system 108 may send, to the vehicle 102, control data representing instruction(s) to perform a maneuver, such as stopping. For a second example, the authorization system 108 may send, to other vehicle(s), control data representing instructions to perform maneuvers, such as stopping. Still, for a third example, the authorization system 108 may perform similar techniques using data associated with other vehicle(s) in order to verify that the control system 106 is compromised. While these are just a couple of examples of actions that may be performed by the authorization system 108, in other examples, the authorization system 108 may perform one or more additional and/or alternative actions.

Although the above examples describe the authorization system 108 as performing the process 800 of FIG. 8, in other examples, another computing device may perform the process 800 of FIG. 8. For example, the vehicle 102 and/or the user device 110 may perform the process 800 of FIG. 8 in order to determine whether the control system 106 is authorized.

EXAMPLE CLAUSES

A: A system comprising: one or more network components; one or more processors; and one or more computer-readable media storing instructions that, when executed by the one or more processors, cause the one or more processors to perform operations comprising: receiving, from an autonomous vehicle, a reported location; sending, to the autonomous vehicle, a request for sensor data; receiving, from the autonomous vehicle, sensor data representing a portion of an environment of the autonomous vehicle; determining, based at least in part on the sensor data and at least a portion of map data, a sensor-based location of the autonomous vehicle; determining a difference between the reported location and the sensor-based location; determining whether the difference meets or exceeds a threshold; and based at least in part on the difference meeting or exceeding the threshold, determining whether the autonomous vehicle is compromised.

B: The system as paragraph A describes, wherein: the sensor data comprises one or more of image data or lidar data; and determining the sensor-based location comprises localizing the autonomous vehicle using the sensor data.

C: The system as either of paragraphs A or B describe, wherein: the determining whether the autonomous vehicle is compromised comprises determining that the autonomous vehicle is compromised; and the operations further comprise sending, to the autonomous vehicle and using the one or more network components, first data representing an instruction to bring the autonomous vehicle to a safe stop.

D: The system as any of paragraphs A-C describe, the operations further comprising sending, to an additional autonomous vehicle and using the one or more network components, a request to move to the reported location.

E: The system as any of paragraphs A-D describe, the operations further comprising: receiving, from the additional autonomous vehicle and using the one or more network components, additional sensor data; and determining an additional difference based at least in part on the additional sensor data and the sensor data, wherein the determining whether the autonomous vehicle is compromised is further based at least in part on the additional difference.

F: The system as any of paragraphs A-E describe, wherein the request for the sensor data comprises a request indicating at least one of: a type of the sensor data that is requested; or a sensor of the autonomous vehicle from which the sensor data is requested.

G: A method comprising: receiving a reported location of an autonomous vehicle; receiving, from the autonomous vehicle, first data generated by at least one sensor of the autonomous vehicle; analyzing the first data with respect to second data associated with an environment at which the autonomous vehicle is navigating; and determining, based at least in part on the analyzing, whether the autonomous vehicle is at the reported location.

H: The method as paragraph G describes, wherein the determining whether the autonomous vehicle is at the reported location comprises: determining, based at least in part on the analyzing, that at least one feature represented by the first data does not match at least one feature represented by the second data; and determining that the autonomous vehicle is not located at the reported location.

I: The method as either of paragraphs G or H describe, further comprising: determining, based at least in part on the analyzing, a sensor-based location of the autonomous vehicle, wherein the determining whether the autonomous vehicle is at the reported location comprises: determining a difference between the reported location and the sensor-based location; determining that the difference is equal to or greater than a threshold; and determining that the autonomous vehicle is not located at the reported location.

J: The method as any of paragraphs G-I describe, further comprising, based at least in part on the determining that the autonomous vehicle is not located at the reported location, performing at least one of: sending, to the autonomous vehicle, third data representing a first instruction associated with navigating the autonomous vehicle; or sending, to an additional autonomous vehicle, fourth data representing a second instruction to navigate to the reported location.

K: The method as any of paragraphs G-J describe, wherein: the second data includes map data representing a map; and the analyzing the first data with respect to the second data comprises comparing the first data to a portion of the map data, the portion of the map data representing the reported location of the autonomous vehicle.

L: The method as any of paragraphs G-K describe, wherein: the second data includes sensor data generated by an additional autonomous vehicle, the sensor data indicating an additional reported location of the additional autonomous vehicle; and the determining whether the autonomous vehicle is at the reported location comprises: determining, based at least in part on the analyzing, that the first data represents the additional autonomous vehicle; and determining that the autonomous vehicle is at the reported location.

M: The method as any of paragraphs G-L describe, wherein: the second data includes sensor data generated by a sensor of an additional autonomous vehicle, the additional autonomous vehicle being within a threshold distance to the autonomous vehicle; and the determining whether the autonomous vehicle is at the reported location comprises: determining, based at least in part on the analyzing, that the sensor data represents the autonomous vehicle; and determining that the autonomous vehicle is at the reported location.

N: The method as recited any of paragraphs G-M describe, further comprising sending, to the autonomous vehicle, a request for the first data, the request indicating at least one of: a type of the first data that is requested; or a sensor of the autonomous vehicle from which the first data is requested.

O: The method as recited any of paragraphs G-N describe, wherein the first data includes at least one of: image data generated by a camera of the autonomous vehicle; or lidar data generated by a lidar sensor of the autonomous vehicle.

P: One or more non-transitory computer-readable media storing instructions that, when executed by one or more processors, cause one or more computing devices to perform operations comprising: receiving a reported location of an autonomous vehicle; receiving, from the autonomous vehicle, first data generated by at least one sensor of the autonomous vehicle; analyzing the first data with respect to second data associated with an environment at which the autonomous vehicle is navigating; and determining, based at least in part on the analyzing, whether the autonomous vehicle is at the reported location.

Q: The one or more non-transitory computer-readable media as paragraph P describes, wherein the determining whether the autonomous vehicle is located at the reported location comprises: determining, based at least in part on the analyzing, that at least one feature represented by the first data does not match at least one feature represented by the second data; and determining that the autonomous vehicle is not located at the reported location.

R: The one or more non-transitory computer-readable media as either of paragraphs P or Q describe, the operations further comprising: determining, based at least in part on the analyzing, a sensor-based location of the autonomous vehicle, wherein the determining whether the autonomous vehicle is at the reported location comprises: determining a difference between the reported location and the sensor-based location; determining that the difference is equal to or greater than a threshold; and determining that the autonomous vehicle is not located at the reported location.

S: The one or more non-transitory computer-readable media as any of paragraphs P-R describe, wherein: the second data includes sensor data generated by an additional autonomous vehicle, the sensor data indicating an additional reported location of the additional autonomous vehicle; and the determining whether the autonomous vehicle is at the reported location comprises: determining, based at least in part on the analyzing, that the first data represents the additional autonomous vehicle; and determining that the autonomous vehicle is at the reported location.

T: The one or more non-transitory computer-readable media as any of paragraphs P-S describe, wherein: the second data includes sensor data generated by a sensor of an additional autonomous vehicle, the additional autonomous vehicle being within a threshold distance to the autonomous vehicle; and the determining whether the autonomous vehicle is at the reported location comprises: determining, based at least in part on the analyzing, that the sensor data represents the autonomous vehicle; and determining that the autonomous vehicle is at the reported location.

U: One or more computing devices comprising: one or more network components; one or more processors; and one or more computer-readable media storing instructions that, when executed by the one or more processors, cause the one or more processors to perform operations comprising: storing first data associated with a fleet of autonomous vehicles, the first data representing a plurality of frequencies at which destination locations are associated with pick-up locations; receiving, using the one or more network components, second data representing a request for an autonomous vehicle of the fleet of autonomous vehicles to pick up a passenger at a first location and drop off the passenger at a second location; retrieving, based at least in part on the first location and the second location, a frequency of the frequencies; determining whether the frequency is less than or equal to a threshold frequency; and based on at least in part on the frequency being less than or equal to the threshold frequency, determining whether a control system associated with the fleet of autonomous vehicles is compromised.

V: The one or more computing devices as recited in claim 1, the operations further comprising, based at least in part on determining that the control system is compromised, performing at least one of: sending, using the one or more network components and to a computing device associated with a teleoperator, third data indicating that the control system is compromised; sending, using the one or more network components and to the computing device associated with the teleoperator, fourth data representing an additional request to authorize the request for the autonomous vehicle; or sending, using the one or more network components and to the autonomous vehicle, fifth data representing request to pick up an additional passenger at a third location.

W: The one or more computing devices as paragraph V describes, the operations further comprising: storing third data representing routes associated with the fleet of autonomous vehicles, the routes including the pick-up locations and the destination locations; and generating the first data using the third data representing the routes.

X: The one or more computing devices as either of paragraphs V or W describe, the operations further comprising: storing third data representing an additional frequency at which the second location is associated with the first location for the passenger, and wherein the determining whether the frequency is less than or equal to the threshold frequency is further based at least in part on the additional frequency.

Y: The one or more computing devices as any of paragraphs V-X describe, the operations further comprising: receiving, using the one or more network components, third data comprising an additional request for an additional autonomous vehicle of the fleet of autonomous vehicles to pick up an additional passenger at a third location and drop off the additional passenger at a fourth location; determining, based at least in part on the third location and the fourth location, an additional frequency of the frequencies; and determining whether the additional frequency is less than or equal to the threshold frequency, and wherein the determining whether the control system associated with the fleet of autonomous vehicles is compromised is further based at least in part on the additional frequency being less than or equal to the threshold frequency.

Z: The one or more computing devices as any of paragraphs V-Y describe, the operations further comprising: ending, using the one or more network components, third data representing the request to a computing device associated with a teleoperator; and receiving, from the computing device associated with the teleoperator, fourth data representing one of: a first control to navigate the autonomous vehicle to the first location; or second control to refrain from navigating the autonomous vehicle to the first location.

AA: A method comprising: storing first data associated with a fleet of autonomous vehicles, the first data representing at least a frequency at which a destination location is associated with a pick-up location; receiving second data representing a request for an autonomous vehicle of the fleet of autonomous vehicles; retrieving, based at least in part on the request, the frequency; determining whether the frequency is less than or equal to a threshold frequency; and based on at least in part on the frequency being less than or equal to the threshold frequency, determining whether a control system associated with the fleet of autonomous vehicles is compromised. \

AB: The method as paragraph AA describes, further comprising: determining that the request is for the autonomous vehicle to pick up a passenger at a first location and drop off the passenger at a second location, and wherein determining the frequency comprises: determining that the first location includes the pick-up location; determining that the second location includes the destination location; and retrieving the frequency based at least in part on the first location including the pick-up location and the second location including the destination location, the frequency indicative of a number of previous trips within a first distance of the pick-up location having a drop-off location within a second distance of the destination location.

AC: The method as either of paragraphs AA or AB describe, further comprising: receiving third data indicating that the request is for the autonomous vehicle to pick up a passenger at a first location and drop off the passenger at a second location, and wherein determining the frequency comprises: determining that the first location is within a first distance of the pick-up location; determining that the second location is within a second distance of the destination location; and determining the frequency based at least in part on the first location and the second location.

AD: The method as any of paragraphs AA-AC describe, further comprising, based at least in part on determining that the control system is compromised, performing at least one of: ending, to a computing device associated with a teleoperator, third data indicating that the control system is compromised; sending, to the computing device associated with the teleoperator, fourth data representing an additional request to authorize the request for the autonomous vehicle; or sending, to the autonomous vehicle, fifth data representing request to pick up a passenger at a third location.

AE: The method as any of paragraphs AA-AD describe, further comprising: storing third data representing a plurality of routes associated with the fleet of autonomous vehicles, the plurality of routes including pick-up locations and destination locations; identifying, using the third data, one or more routes of the plurality of routes that include the pick-up location and the destination location; and generating the first data using the one or more routes.

AF: The method as any of paragraphs AA-AE describe, further comprising: storing third data representing a plurality of routes associated with a passenger, the plurality of routes including pick-up locations and destination locations; identifying, using the third data, one or more routes of the plurality of routes that begin within a first threshold distance of the pick-up location and end within a second threshold distance of the destination location; and generating the first data using the one or more routes.

AG: The method as any of paragraphs AA-AF describe, further comprising: storing third data representing an additional frequency at which a passenger sends requests that are within a threshold distance of the pick-up location and the destination location, and wherein the determining whether the frequency is less than or equal to the threshold frequency is further based at least in part on the additional frequency.

AH: The method as any of paragraphs AA-AG describe, further comprising: storing third data associated with the fleet of autonomous vehicles, the third data representing at least an additional frequency at which an additional destination location is associated with an additional pick-up location; receiving fourth data representing an additional request for an additional autonomous vehicle of the fleet of autonomous vehicles; determining, based at least in part on the additional request, the additional frequency; and determining whether the additional frequency is less than or equal to the threshold frequency, and wherein the determining whether the control system associated with the fleet of autonomous vehicles is compromised is further based at least in part on the additional frequency being less than or equal to the threshold frequency.

AI: The method as any of paragraphs AA-AH describe, further comprising: sending third data representing the request to a computing device associated with a teleoperator; and receiving, from the computing device, fourth data representing one of: a first control to navigate the autonomous vehicle to a location associated with the request; or a second control to refrain from navigating the autonomous vehicle to the location.

AJ: One or more non-transitory computer-readable media storing instructions that, when executed by one or more processors, cause one or more computing devices to perform operations comprising: storing first data associated with a fleet of autonomous vehicles, the first data representing at least a frequency at which a destination location is associated with a pick-up location; receiving a request for an autonomous vehicle of the fleet of autonomous vehicles; retrieving, based at least in part on the request, the frequency; determining whether the frequency is less than or equal to a threshold frequency; and based on at least in part on the frequency being less than or equal to the threshold frequency, determining whether a control system associated with the fleet of autonomous vehicles is compromised.

AK: The one or more non-transitory computer-readable media as paragraph AJ describes, the operations further comprising: determining that the request is for the autonomous vehicle to pick up a passenger at a first location and drop off the passenger at a second location, and wherein determining the frequency comprises: determining that the first location is within a first distance of the pick-up location; determining that the second location is within a second distance of the destination location; and determining the frequency based at least in part on the first location and the second location.

AL: The one or more non-transitory computer-readable media as either of paragraphs AJ or AK describe, the operations further comprising, based at least in part on determining that the control system is compromised, performing at least one of: sending, to a computing device associated with a teleoperator, third data indicating that the control system is compromised; sending, to the computing device associated with the teleoperator, fourth data representing an additional request to authorize the request for the autonomous vehicle; or sending, to the autonomous vehicle, fifth data representing request to pick up an additional passenger at a third location.

AM: The one or more non-transitory computer-readable media as any of paragraphs AJ-AL describe, the operations further comprising: storing third data representing a plurality of routes associated with the fleet of autonomous vehicles, the plurality of routes including pick-up locations and destination locations; identifying, using the third data, one or more routes of the plurality of routes that include the pick-up location and the destination location; and generating the first data using the one or more routes.

AN: The one or more non-transitory computer-readable media as any of paragraphs AJ-AM describe, the operations further comprising: storing third data representing a plurality of routes associated with a passenger, the plurality of routes including a plurality of passenger pick-up locations and a plurality of passenger destination locations; identifying, using the third data, one or more routes of the plurality of routes that are begin within a first threshold distance of the pick-up location and end within a second threshold distance of the destination location, wherein determining whether the control system associated with the fleet of autonomous vehicles is compromised is further based at least in part on the third data.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more network components;
one or more processors; and
one or more computer-readable media storing instructions that, when executed by the one or more processors, cause the one or more processors to perform operations comprising:
receiving, from an autonomous vehicle, a reported location;
sending, to the autonomous vehicle, a request for sensor data;
receiving, from the autonomous vehicle, sensor data representing a portion of an environment of the autonomous vehicle;
determining, based at least in part on the sensor data and at least a portion of map data, a sensor-based location of the autonomous vehicle;
determining a difference between the reported location and the sensor-based location;
determining that the difference meets or exceeds a threshold; and
based at least in part on the difference meeting or exceeding the threshold, determining that the autonomous vehicle is not located at the reported location.

2. The system as recited in claim 1, wherein:
the sensor data comprises one or more of image data or lidar data; and
the determining the sensor-based location comprises localizing the autonomous vehicle using the sensor data.

3. The system as recited in claim 1,
the operations further comprising sending, to the autonomous vehicle and using the one or more network components, first data representing an instruction to bring the autonomous vehicle to a safe stop.

4. The system as recited in claim 1, the operations further comprising sending, to an additional autonomous vehicle and using the one or more network components, a request to move to the reported location.

5. The system as recited in claim 1, the operations further comprising:
receiving, from the autonomous vehicle and using the one or more network components, additional sensor data; and
determining an additional difference based at least in part on the additional sensor data and the sensor data,
wherein the determining that the autonomous vehicle is not located at the reported location is further based at least in part on the additional difference.

6. The system as recited in claim 1, wherein the request for the sensor data comprises a request indicating at least one of:
a type of the sensor data that is requested; or
a sensor of the autonomous vehicle from which the sensor data is requested.

7. A method comprising:
receiving a reported location of an autonomous vehicle;
receiving, from the autonomous vehicle, first data generated by at least one sensor of the autonomous vehicle;
analyzing the first data with respect to second data associated with an environment at which the autonomous vehicle is navigating;
determining, based at least in part on the analyzing, that at least one feature represented by the first data does not match at least one feature represented by the second data; and
determining that the autonomous vehicle is not located at the reported location.

8. The method as recited in claim 7, further comprising:
determining, based at least in part on the at least one feature represented by the first data not matching the at least one feature represented by the second data, a sensor-based location of the autonomous vehicle;
determining a difference between the reported location and the sensor-based location; and
determining that the difference is equal to or greater than a threshold,
wherein the determining that the autonomous vehicle is not located at the reported location is based at least in part on the difference being equal to or greater than the threshold.

9. The method as recited in claim 7, further comprising, based at least in part on the determining that the autonomous vehicle is not located at the reported location, performing at least one of:
sending, to the autonomous vehicle, third data representing a first instruction associated with navigating the autonomous vehicle; or
sending, to an additional autonomous vehicle, fourth data representing a second instruction to navigate to the reported location.

10. The method as recited in claim 7, wherein:
the second data includes map data representing a map; and
the analyzing the first data with respect to the map data comprises comparing the first data to a portion of the map data, the portion of the map data representing the reported location of the autonomous vehicle.

11. The method as recited in claim 7, wherein:
the second data includes sensor data generated by a sensor of an additional autonomous vehicle, the additional autonomous vehicle being located outside of a threshold distance to the autonomous vehicle; and
the determining that the at least one feature represented by the first data does not match the at least one feature represented by the sensor data comprises determining, based at least in part on the analyzing, that the sensor data represents the autonomous vehicle.

12. The method as recited in claim 7, further comprising sending, to the autonomous vehicle, a request for the first data, the request indicating at least one of:
a type of the first data that is requested; or
a sensor of the autonomous vehicle from which the first data is requested.

13. The method as recited in claim 7, wherein the first data includes at least one of:
image data generated by a camera of the autonomous vehicle; or
lidar data generated by a lidar sensor of the autonomous vehicle.

14. One or more non-transitory computer-readable media storing instructions that, when executed by one or more processors, cause one or more computing devices to perform operations comprising:
receiving a reported location of an autonomous vehicle;
receiving, from the autonomous vehicle, first data generated by at least one sensor of the autonomous vehicle;
analyzing the first data with respect to second data associated with an environment at which the autonomous vehicle is navigating;
determining, based at least in part on the analyzing, that at least one feature represented by the first data does not match at least one feature represented by the second data; and
determining that the autonomous vehicle is not located at the reported location.

15. The one or more non-transitory computer-readable media as recited in claim 14, the operations further comprising:
determining, based at least in part on the at least one feature represented by the first data does not matching the at least one feature represented by the second data, a sensor-based location of the autonomous vehicle;
determining a difference between the reported location and the sensor-based location; and
determining that the difference is equal to or greater than a threshold; and threshold,
wherein the determining that the autonomous vehicle is not located at the reported location is based at least in part on the difference being equal to or greater than the threshold.

16. The one or more non-transitory computer-readable media as recited in claim 14, wherein:
the second data includes sensor data generated by a sensor of an additional autonomous vehicle, the additional autonomous vehicle being within a threshold distance to the autonomous vehicle; and
the determining that the at least one feature represented by the first data does not match the at least one feature represented by the sensor data comprises determining, based at least in part on the analyzing, that the sensor data represents the autonomous vehicle.

17. The method as recited in claim 7, wherein:
the second data includes map data representing a map;
the analyzing the first data with respect to the map data comprises comparing the first data to a portion of the map data, the portion of the map data representing the reported location of the autonomous vehicle; and the determining that the at least one feature represented by the first data does not match the at least one feature represented by the map data comprises determining, based at least in part on the comparing, that the first data does not represent portion of the map data.

18. The one or more non-transitory computer-readable media as recited in claim 14, wherein:
   the second data includes map data representing a map; and
   the analyzing the first data with respect to the map data comprises comparing the first data to a portion of the map data, the portion of the map data representing the reported location of the autonomous vehicle.

19. The one or more non-transitory computer-readable media as recited in claim 14, the operations further comprising sending, to the autonomous vehicle, a request for the first data, the request indicating at least one of:
   a type of the first data that is requested; or
   a sensor of the autonomous vehicle from which the first data is requested.

20. The one or more non-transitory computer-readable media as recited in claim 14, wherein the first data includes at least one of:
   image data generated by a camera of the autonomous vehicle; or
   lidar data generated by a lidar sensor of the autonomous vehicle.

* * * * *